United States Patent [19]
Suda et al.

[11] Patent Number: 5,970,138
[45] Date of Patent: Oct. 19, 1999

[54] TERMINAL EQUIPMENT FOR TELECOMMUNICATIONS AND INFORMATION PROCESSING

[75] Inventors: Yozo Suda, Kawasaki; Yuji Yamaguchi, Tachikawa, both of Japan

[73] Assignee: Fujitsu Limited, Kawasaki, Japan

[21] Appl. No.: 08/760,145

[22] Filed: Dec. 3, 1996

[30] Foreign Application Priority Data

Dec. 4, 1995 [JP] Japan ................................. 7-315116
Nov. 15, 1996 [JP] Japan ................................. 8-304555

[51] Int. Cl.⁶ .................................................... H04M 1/00
[52] U.S. Cl. .......................... 379/412; 379/398; 379/413; 333/22 R
[58] Field of Search ..................................... 379/412, 416, 379/398, 414, 413; 455/82, 83, 296, 300, 301; 375/257; 361/43; 330/69, 149, 258; 333/12, 181, 25, 177, 32, 132, 167, 22 R; 324/526, 613

[56] References Cited

U.S. PATENT DOCUMENTS 3,697,896 10/1972 Sarkozi et al. ............................ 333/12
3,766,337 10/1973 Duimelaar ................................ 379/348
3,942,168 3/1976 Whyte .................................. 340/310 R
5,642,412 6/1997 Reymond ................................ 379/398
5,642,416 6/1997 Hill et al. ................................. 379/416
5,659,273 8/1997 Harpham .................................. 379/416

Primary Examiner—Forester W. Isen
Assistant Examiner—Jacques M. Saint-Surin
Attorney, Agent, or Firm—Staas & Halsey, LLP

[57] ABSTRACT

Terminal equipment for telecommunications and information processing with improved electromagnetic compatibility (EMC). The equipment has a human-machine interface (HMI), a metallic telecommunications interface (TCI), and optionally a power line interface (PLI). First common-mode rejection filters consisting of common-mode choke coils and shunt capacitors are placed at the HMI interface of the equipment, while second common-mode rejection filters consisting of the same components are placed at the TCI and PLI interfaces. High-frequency junction points of the first and second common-mode rejection filters are interconnected with a bypass circuit. Being isolated from the signal ground and frame ground of the equipment, the bypass circuit is an independent non-grounded circuit. Such internal structure makes it possible to reject noise signals induced by an external noise source and also to suppress spurious radiation from an internal noise source.

24 Claims, 34 Drawing Sheets

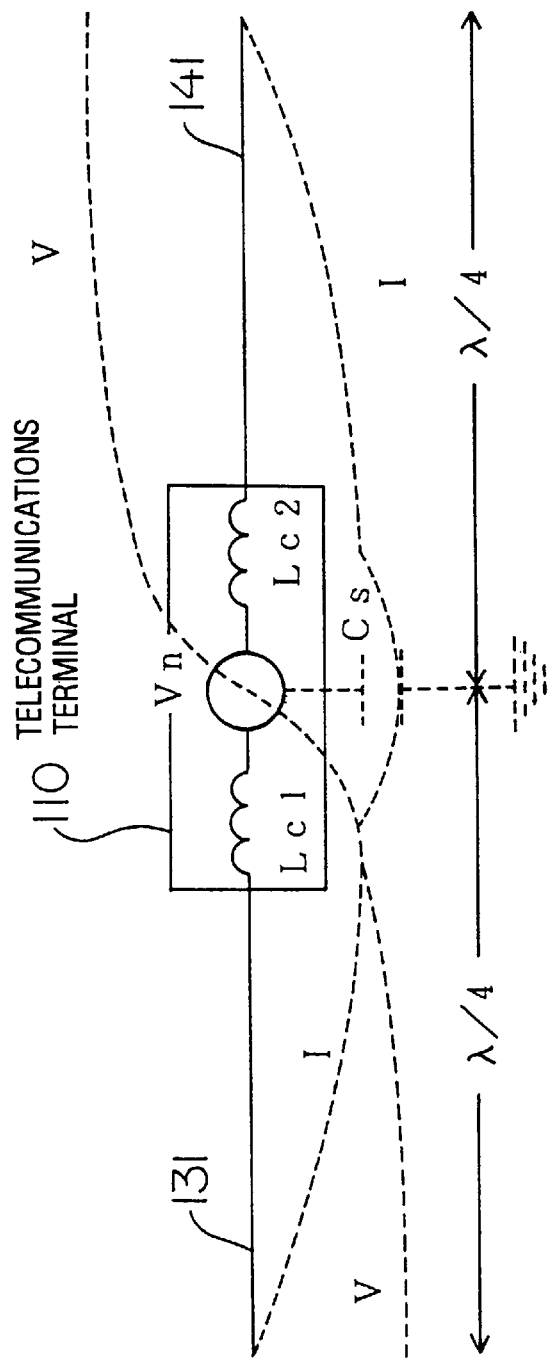

TERMINAL EQUIPMENT FOR TELECOMMUNICATIONS AND INFORMATION PROCESSING

BACKGROUND OF THE INVENTION

1. Field of the Invention

The present invention relates to terminal equipment for telecommunications and information processing with improved electromagnetic compatibility (EMC), and more specifically, to terminal equipment for telecommunications and information processing which has a human-machine interface (HMI) and a metallic telecommunications interface (TCI).

2. Description of the Related Art

Electromagnetic compatibility of terminal equipment for telecommunications and information processing, including telecommunication terminal equipment (TTE) and information technology equipment (ITE), has been strongly demanded these days, from practical viewpoints as well as in some legal aspects.

Publication No.22 issued by the International Special Committee on Radio Interference (CISPR) in the International Electrotechnical Commission (IEC) provides standards specifically concerning electromagnetic interference (EMI) for ITE. Another publication CISPR No.24, a draft standard under review, describes about immunity from electromagnetic interference. EMC-related legislation in many countries is based on those international standards, and the TTE and ITE are now about to become subject to the regulation requiring conformity to their relevant standards.

As described above, the requirement of electromagnetic compatibility in the terminal equipment for telecommunications and information processing (hereafter, shortened as "info-telecom equipment") has two aspects: immunity and interference. First, the immunity is defined as a tolerance to attack by electromagnetic waves which may be available in a predetermined electromagnetic environment, where the info-telecom equipment must operate as designed without any problems. Second, the interference calls for limitation of electromagnetic disturbance to the environment at a predetermined level.

For more practical example, the info-telecom equipment is required to exhibit enough immunity to an approaching citizens band (CB) radio device with high power outputs violating the regulations. It is also demanded to have a prescribed immunity to an industrial-scientific-medical (ISM) device installed nearby. Note that those noise-generating devices would produce a field strength as high as 1 V/m to 10 V/m. In addition to such immunity performance, the info-telecom equipment is regulated not to produce too much electromagnetic noises that could cause audible noises, beat disturbance, or malfunctions of television sets and/or radio receivers in the neighborhood.

The info-telecom equipment subject to the EMC regulation includes a vast range of devices encompassing telecommunications terminal equipment such as analog and digital telephone sets and facsimiles, and information technology equipment such as personal computers, word processors, and computer's dedicated I/O terminals.

Take analog/digital telephone sets for instance. Their main bodies are connected to human-machine interface (HMI) devices such as handsets and headsets, as well as being wired to a public telephone network through a metallic telecommunications interface (TCI). Likewise, the information technology equipment is often coupled to some HMI devices such as keyboards, display units, microphones, and speakers, besides being linked to TCI facilities through modems for an analog circuit or through terminal adapters for a digital circuit. As such, the info-telecom equipment in general has connections to both HMI and TCI, and in many cases, has a power line interface (PLI), through which the equipment is supplied with its main power from a commercial power source.

Those HMI and TCI connection lines, however, may work as antennas to catch some electromagnetic noises or to emit them to the outside space. Therefore, when thinking about measures to be taken for solving the EMC problems (including both immunity and interference) in the info-telecom equipment, it must cover not only the main body of the equipment but the entire system including the HMI and TCI connections.

FIG. 31 is a diagram showing an outline of the info-telecom equipment to describe EMC problems concerned therewith. As previously explained, the main body of telecommunications terminal 110 is connected to an HMI unit 120 via HMI cables 131 and 132. The terminal 110 is also connected to a public or private communication network 160 via a TCI cable 141 and to an AC power supply 150 via a PLI cord 142.

The telecommunications terminal 110 consists of the following circuits: a receiver 111 and a driver 112 for interfacing with the HMI unit 120; an internal circuit 113 for main processing; a driver 114, a receiver 115, and a hybrid circuit 116 for interfacing with the TCI facilities. The internal circuit 113 is organized by a signal processing circuit, clock oscillators, and a CPU chip. This kind of circuit may malfunction if attacked by some external noise signals that exceed an allowable level or contain some frequency components which is particularly critical in their mutual interference. In turn, the components in the internal circuit 113 can be a source of electromagnetic noises that may affect operations of peripheral devices. Returning to FIG. 31, the HMI unit 120 contains a transmitter 121 and a receiver 122.

When an electromagnetic noise source 161 is closely located to the HMI cable 131, some electromagnetic noise signals will enter the telecommunications terminal 110 as indicated by a broken line A1. Similarly, when further electromagnetic noise sources 162 and 163 approach the TCI cable 141 and the PLI cord 142, some noise signals may go into the terminal 110 as indicated by broken lines A2 and A3, respectively.

On the other hand, a noise current having leaked from the internal circuit 113 to the HMI cable 132 will cause an emission of electromagnetic noise toward the outside of the terminal 110 as indicated by a broken line B1. Likewise, another noise current from the internal circuit 113 to the TCI cable 141 would result in an electromagnetic noise emission as indicated by a broken line B2.

The following description will present the detailed propagation paths of electromagnetic noise signals. FIG. 32 is a diagram showing such possible paths along which the noise goes into the telecommunications terminal 110. In addition to the aforementioned receiver 111, internal circuit 113, and driver 114, FIG. 32 shows two more components in the terminal 110: a common-mode choke coil Lc1 inserted between the HMI cable 131 and receiver 111, and another common-mode choke coil Lc2 inserted between the TCI cable 141 and driver 114.

An input signal source Eh is connected at the far end of the HMI cable 131, and another input signal source Et is provided at the far end of the TCI cable 141. There are two more signal sources in FIG. 32, which voltages are developed over the earth potential, being induced by external electromagnetic noise sources. Under the assumption that the two induced voltages have nearly the same amplitude, a symbol Un is assigned to both of them. The signal ground SG and frame ground FG of the telecommunications terminal 110 are connected to each other at a single point and those two ground potentials have a capacitive coupling to the ground through a stray capacitance Cs.

The route of noise currents that flow into the terminal will be now discussed below. The induced voltage Un at the HMI cable 131 can be 1 V to 3 V in some cases that a portable telephone or CB radio device is placed near the terminal. The Un noise current enters the internal circuit 113 through the HMI cable 131 and internal coupling capacitance Cc1 and Cc2 (as indicated by broken lines) and flows away to the ground via the signal ground SG, frame ground FG, and stray capacitance Cs.

Another induced voltage that appears on the TCI cable 141 has a similar voltage level and it causes a noise current that circulates in a loop formed by coupling capacitance Cc3 and Cc4, signal ground SG, frame ground FG, and stray capacitance Cs.

Generally speaking, because of a difference in capacitance between Cc1 and Cc2 and some other reasons, the impedance of the two signal conductors of the HMI cable 131 are not balanced with respect to the ground, thus causing a difference in their respective currents from the common noise source Un (i.e., a difference in common-mode currents). This unbalanced circuit scheme produces a difference in the noise voltages observed at two input terminals of the receiver 111 with respect to the ground potential, and it will cause a variation in its envelope detection signal because of non-linearity of input characteristics of the receiver 111. That is, the induced noise voltage Un results in a demodulation noise voltage (i.e., a differential voltage between the two signal conductors), which will degrade the S/N ratio in reception of the input signal Eh. This can be a cause of interference troubles in the case of analog HMI or deterioration of bit error rates (BER) in the case of digital HMI. The same problems as described above can happen to the driver 114 at the TCI side of the terminal.

Further, when the frequency of the electromagnetic noise source is equal to the internal clock frequency or bus cycle frequency or expressed as an integral multiple (or fraction) thereof, a beat may occur and it sometimes leads to a malfunction of counters and dividers contained in the internal circuit 113.

Use of common-mode choke coils is one of the traditional techniques that have been widely adapted as a countermeasure to the above noise problems. In the telecommunications terminal of FIG. 34, for example, the common-mode choke coils Lc1 and Lc2 are placed at the connection points of the HMI cable 131 and TCI cable 141. However, those choke coils do not provide enough performance for the reasons described below.

FIG. 33 is a diagram schematically representing the telecommunications terminal 110 and associated cables in FIG. 32 as an equivalent antenna circuit. FIG. 33 shows how the terminal 110 with the cables 131 and 141 will behave when they are exposed in a strong noise field. According to this figure, one end of the HMI cable 131, at least, is electrically open with respect to the ground, while the body of the terminal 110 has a certain impedance to the ground lower than that of the HMI cable 131 due to its stray capacitance Cs. As a result, a standing wave Ua is produced on the HMI cable 131, which wave has a voltage loop at the open end of the HMI cable 131 and a voltage node at the body of the terminal 110.

On the other hand, the noise wave induced on the TCI cable 141, which is longer than the HMI cable 131 in most cases, propagates through the body of the terminal 110 and reflects at the open end of the HMI cable 131. This also causes a standing wave Ub, continuous to the aforementioned standing wave Ua, whose voltage loop is at the point one half-wavelength away from the end of the HMI cable 131. The voltage node of the standing wave Ub is located at the body of the terminal 110. As such, the system shown in FIG. 32 can be expressed in the equivalent antenna system in FIG. 33.

When the electrical length (i.e., the length of a conductor in terms of wavelength) of the HMI cable 131 including a loading effect of the common-mode choke coils Lc1 and Lc2 is an odd multiple of quarter-wavelength, the antenna system shown in FIG. 33 will resonate at that frequency, thus causing an induced noise current flowing through the telecommunications terminal 110 as indicated by the broken line I. This noise current will then produce maximum amplitude of voltage drop Vi at the internal circuit 113.

More specific calculations will be now presented, taking the following three examples for the electrical length of the HMI cable 131 including common-mode choke coils in the terminal 110. When the total electrical length is about 2.8 m, 1.5 m, or 0.5 m, the noise immunity of the terminal 110 will be expected to deteriorate at the frequencies 27 MHz (CB radio service), 50 MHz (amateur band), or 144 MHz (amateur band), respectively. It is because the above-listed electrical lengths coincide with one quarter-wavelength at those frequencies. Likewise, the noise immunity may be degraded at 80 MHz (FM radio), 150 MHz (police radio), or 430 MHz (amateur band), at which frequencies the above-listed electrical lengths correspond to three quarter-wavelengths.

In general, antenna systems will reversibly work for both transmission and reception of radio signals. Thus the HMI and TCI cables 131 and 141 also serve as a transmission antenna that will radiate spurious radio waves to the surrounding air if there is any internal noise source. As a matter of fact, a broadband noise source does exist inside the telecommunications terminal 110, such as clock oscillators and their divided frequency signals. FIG. 34 schematically shows such behavior as a transmission antenna of the telecommunications terminal 110 in FIG. 32. A noise source Vn in FIG. 34 represents clock oscillators and the like which may cause spurious radiation.

Similarly to the mechanism of external noise reception, the spurious radio waves are emitted from the equivalent antenna system of FIG. 34. When the electrical length of the HMI cable 131 including a loading effect of the common-mode choke coils Lc1 and Lc2 equals any odd multiple of quarter-wavelength of the internal noise signal, the antenna system resonates and thus radiates spurious waves at enhanced strength.

As a result of resonance, such spurious emission can sometimes exceed a tolerance level defined in some EMI regulations. The above discussion has clarified some EMC problems with telecommunications terminal equipment, however, the same problems can happen to information technology equipment having communications capabilities integrated therein or externally added thereto. A PLI cord, when attached, will function as part of the antenna element in the same way as the TCI cable.

As described above, since the HMI and TCI cables or PLI cord may serve as a reception antenna, the info-telecom equipment is likely to be affected by an external source of electromagnetic noise. Also, since the same cables act in turn as a transmission antenna resonating at internal noise frequencies, it makes an enhanced radiation of electromagnetic noise to outside. Those EMC problems, however, have not been solved yet by conventional techniques.

SUMMARY OF THE INVENTION

Taking the above into consideration, an object of the present invention is to provide terminal equipment for telecommunications and information processing with improved electromagnetic compatibility.

To accomplish the above object, according to the present invention, there is provided terminal equipment for telecommunications and information processing which has a human-machine interface and a metallic telecommunications interface. This terminal equipment comprises: a first common-mode rejection filter disposed at a connection point of the human-machine interface; a second common-mode rejection filter disposed at a connection point of the metallic telecommunications interface; and a bypass circuit for interconnecting a first high-frequency junction point of the first common-mode rejection filter and a second high-frequency junction point of the second common-mode rejection filter.

There is also provided another type of terminal equipment that comprises: a first common-mode rejection filter disposed at a connection point of the human-machine interface; a second common-mode rejection filter disposed at a connection point of the metallic telecommunications interface; and a distributed-constant transmission line having two conductors. One of the two conductors is used for interconnection between a first high-frequency junction point of the first common-mode rejection filter and a second high-frequency junction point of the second common-mode rejection filter, while the other one of the two conductors is connected to a frame ground or a signal ground of the terminal equipment.

There is also provided still another type of terminal equipment that comprises: a first common-mode rejection filter disposed at a connection point of the human-machine interface; a second common-mode rejection filter disposed at a connection point of the metallic telecommunications interface; and a series resonance circuit for interconnecting a first high-frequency junction point of the first common-mode rejection filter and a second high-frequency junction point of the second common-mode rejection filter. This series resonance circuit shows minimum impedance at a particular disturbance frequency generated by an external noise source or at a particular spurious frequency generated by an internal noise source.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 34 is a diagram schematically representing a telecommunications terminal as an equivalent antenna system radiating electromagnetic noises.

DESCRIPTION OF THE PREFERRED EMBODIMENTS

Several embodiments of the present invention will be described below with reference to the drawings.

Figure 1:
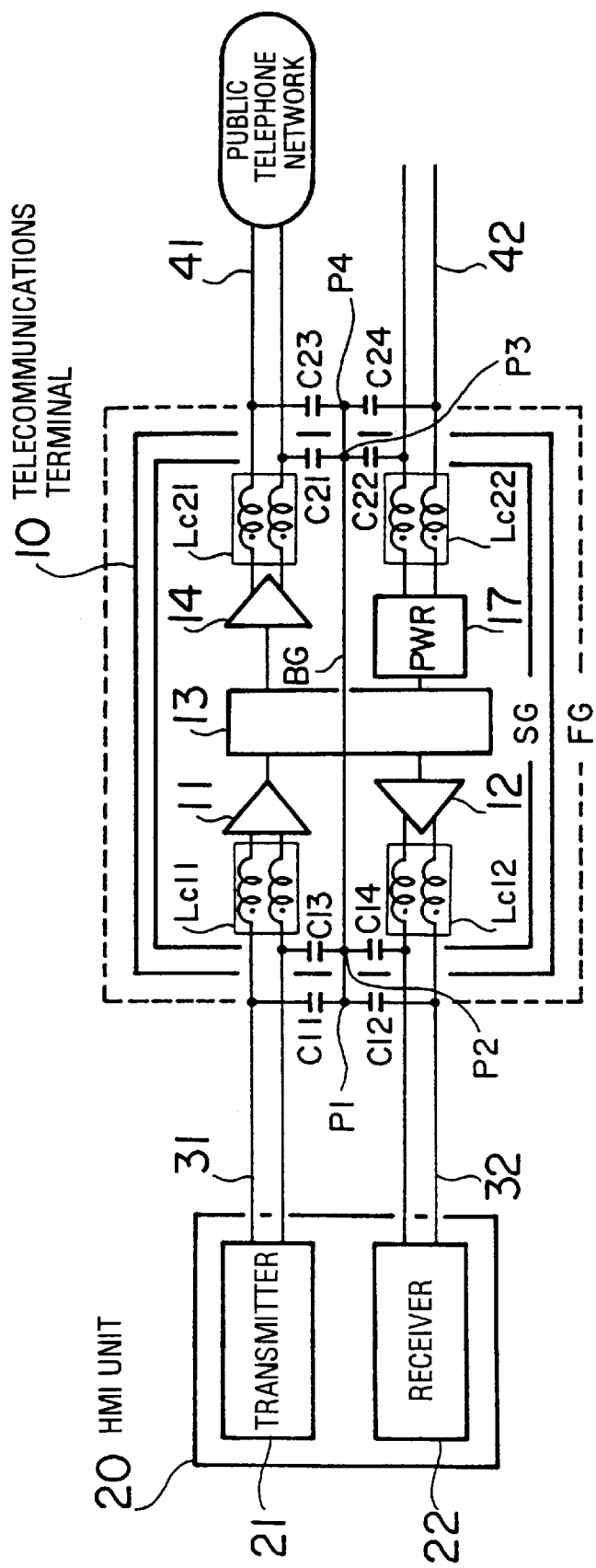
FIG. 1 is a conceptual view of a communications system which specifically represents terminal equipment for telecommunications and information processing according to the present invention.

FIG. 1 is a conceptual view of a communications system which specifically represents terminal equipment for telecommunications and information processing according to the present invention. Telecommunications terminal 10 is connected to a transmitter 21 and a receiver 22 in an HMI unit 20 via HMI cables 31 and 32, respectively. The terminal 10 is also connected to a public communication network with a TCI cable 41 and provided with an external AC power source via a PLI cord 42.

The terminal 10 contains the following main elements: a receiver 11 and driver 12 for interfacing with the HMI unit 20; an internal circuit 13 for signal processing; a driver/receiver 14 for interfacing with the TCI facility; and an internal power supply (PWR) 17 for providing power to the other elements. It also employs first common-mode rejection filters Lc11-C11/C13 and Lc12-C12/C14, each consisting of a common-mode choke coil (Lc) and two shunt capacitors (C), which are placed at the connection points of the HMI cables 31 and 32, respectively. The terminal 10 further incorporates second common-mode rejection filters Lc21-C21/C23 and Lc22-C22/C24 placed at the connection points of the TCI cable 41 and PLI cord 42, respectively.

Junction points P1 and P2 are the common potential of the first common-mode rejection filters, while other junction points P3 and P4 are those of the second common-mode rejection filters. As will be described later, high-frequency components of noise signals appear at those junction points, and thus they are referred to as "high-frequency junction points." In the terminal 10 according to the present invention, those high-frequency junction points P1–P4 are interconnected by a bypass circuit BG, which is isolated from the signal ground SG or frame ground FG (i.e., BG is not grounded).

The following will now describe in detail about how this system suppresses the incoming electromagnetic noise.

While carrying transmission data signals from the transmitter 21, the HMI cable 31 also functions as an antenna to catch the radio waves generated by an external noise source, thus producing an induced voltage simultaneously on two conductors thereof. Since this induced voltage is a common-mode noise, the two conductors are driven just in the same way (i.e., identical in amplitude and phase) with respect to the ground potential. This common-mode noise signals having entered the terminal 10 now reach the common-mode choke coil Lc11. Since common-mode choke coils are designed so as to act as inductors to common-mode inputs, they exhibit a higher impedance as the input frequency increases. From this principle, it is expected to reject common-mode noises more effectively at higher frequency ranges.

In reality, however, the common-mode choke coils have some flux leakage from their windings and some stray capacitance between the windings, which produce some coupling paths to other circuits or cause unexpected impedance decrease at a high-frequency range. That is, the high-frequency common-mode noise signals may be transferred to internal wiring patterns through the mutual-inductive coupling and/or capacitive coupling. Perfect common-mode noise rejection can never be achieved solely with the common-mode choke coils.

For the above reasons, the telecommunications terminal 10 shown in FIG. 1 employs a bypass circuit BG to short-circuit the HMI cables 31 and 32, TCI cable 41, and PLI cord 42 with each other through capacitive coupling that shows negligibly low impedance at high frequencies. In such a configuration, common-mode rejection filters are constructed with the common-mode choke coils and the coupling capacitors. Common-mode noise signals including high-frequency components, which cannot be rejected solely by the common-mode choke coil Lc11, will flow into this bypass circuit BG through capacitors C11 and C13. The second common-mode rejection filters share the bypass circuit BG at the other end thereof, where the TCI cable 41 and PLI cord 42 are connected to the terminal 10.

With its substantially zero impedance, the bypass circuit BG will reduce the noise voltage induced inside the terminal 10, thus achieving an excellent common-mode noise rejection. The above discussion has focused on the common-mode noise from the HMI cable 31, however, it should be noted that the same countermeasure is also applicable to the other cables 32, 41, and 42.

Figure 2:
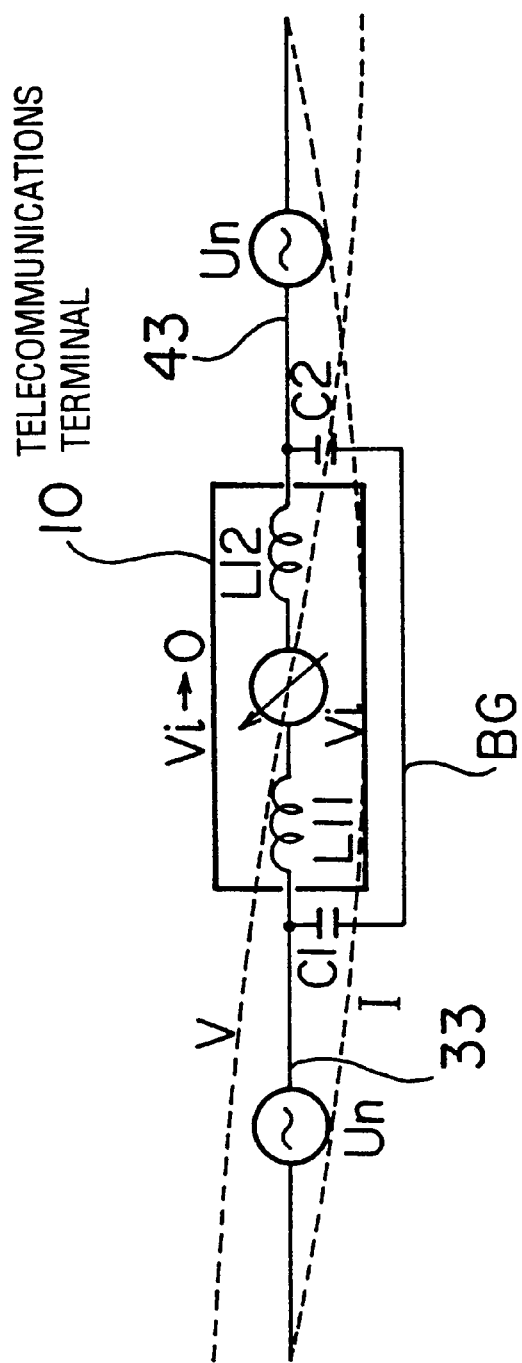
FIG. 2 is a diagram schematically representing telecommunications terminal equipment as an equivalent antenna system.

FIG. 2 is a simplified representation of the telecommunications terminal 10 as an equivalent antenna system, in which the HMI cable 33 and TCI cable 43 act as antenna elements. Those antenna elements will receive noise frequencies from an external source that interferes with the terminal 10. FIG. 2 shows the received noise signals in the form of equivalent signal sources Un located in the middle of the HMI cable 33 and TCI cable 43.

In the terminal 10, common-mode choke coils L11 and L12 and a voltage meter Vi are illustrated. This voltage meter Vi is only for explanatory purposes to indicate a common-mode noise voltage that the terminal 10 receives from an external noise source. Capacitors C1 and C2 provides capacitive coupling between the bypass circuit BG and the HMI and TCI cables 33 and 43.

When a noise signal with high-frequency components over 100 MHz goes into the system shown in FIG. 1, and if the bypass circuit BG is constructed only with a single ground wire, the BG may behave as a high-impedance circuit separated from the signal ground SG and frame ground FG. In such a case, the bypass circuit BG should be constructed with a distributed-constant transmission line such as a coaxial cable or a parallel-wire transmission line.

Figure 3:
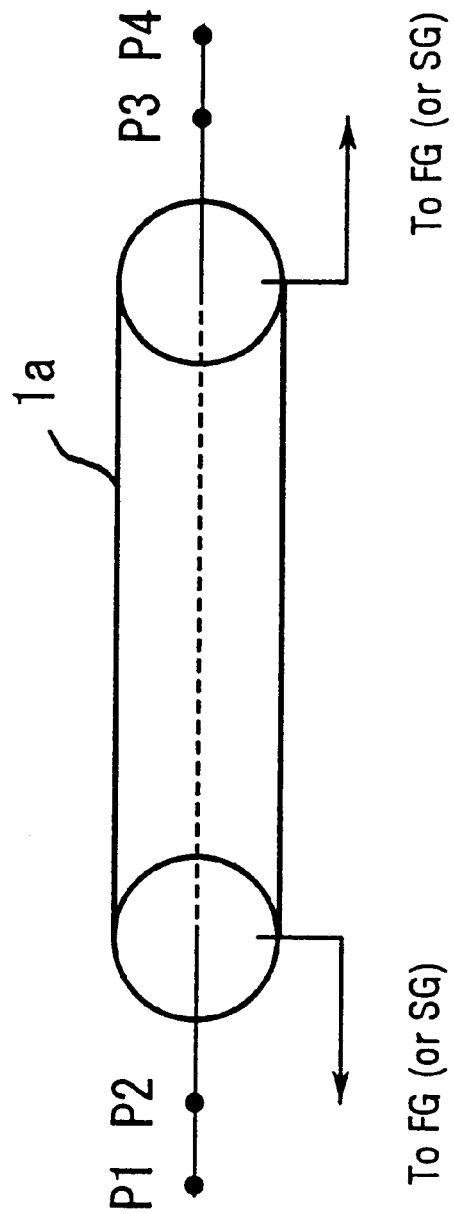
FIG. 3 is a diagram showing a bypass circuit BG constructed with a coaxial cable.
Figure 4:
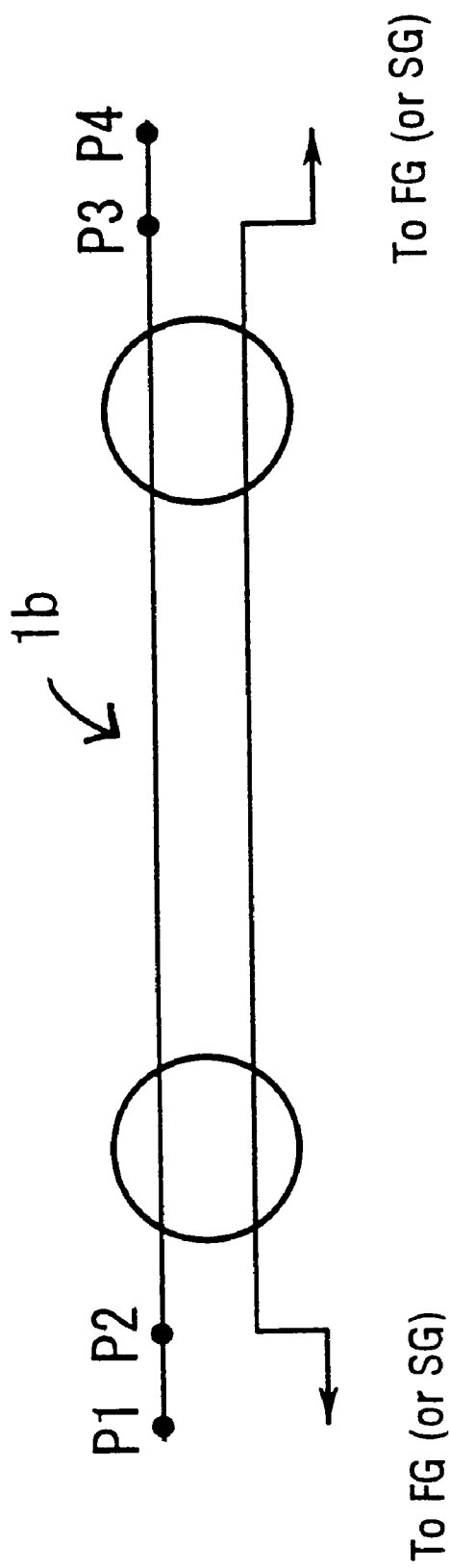
FIG. 4 is a diagram showing a bypass circuit BG constructed with a parallel-wire transmission line.

FIG. 3 shows the bypass circuit BG constructed with a coaxial cable 1a. The inner conductor of the coaxial cable 1a is used for the BG connection, while the outer conductor is used to connect the frame ground FG or the signal ground SG of the terminal 10. FIG. 4 shows the BG constructed with a parallel-wire transmission line 1b. One lead is used for the BG connection, while the other is used to connect the FG or SG at both ends. Those two BG arrangements will deal with the noise source having high-frequency components of above 100 MHz.

Telephone sets are the most common telecommunications terminal equipment and subject to application of the present invention. To show a more specific embodiment of the present invention, the following description will take up this telephone set application.

Figure 5:
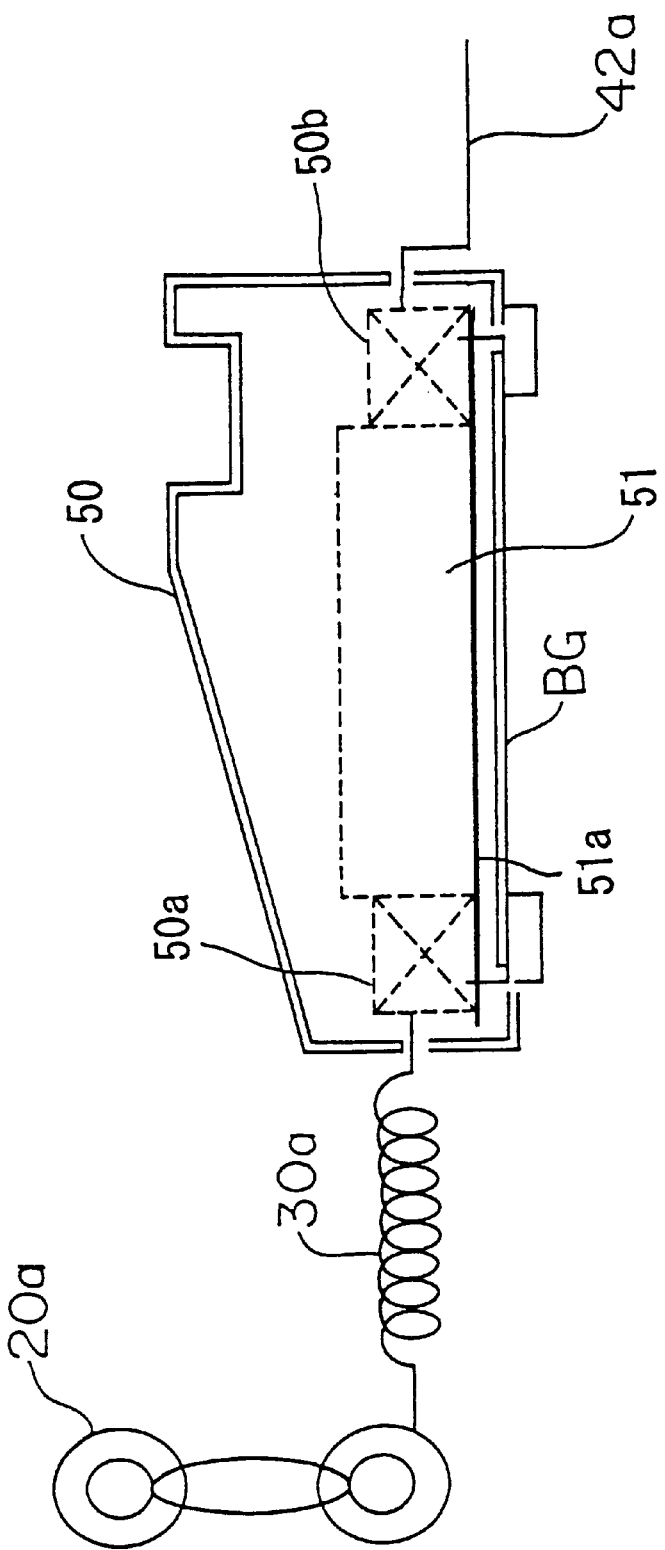
FIG. 5 is a side section view of a telephone set.
Figure 6:
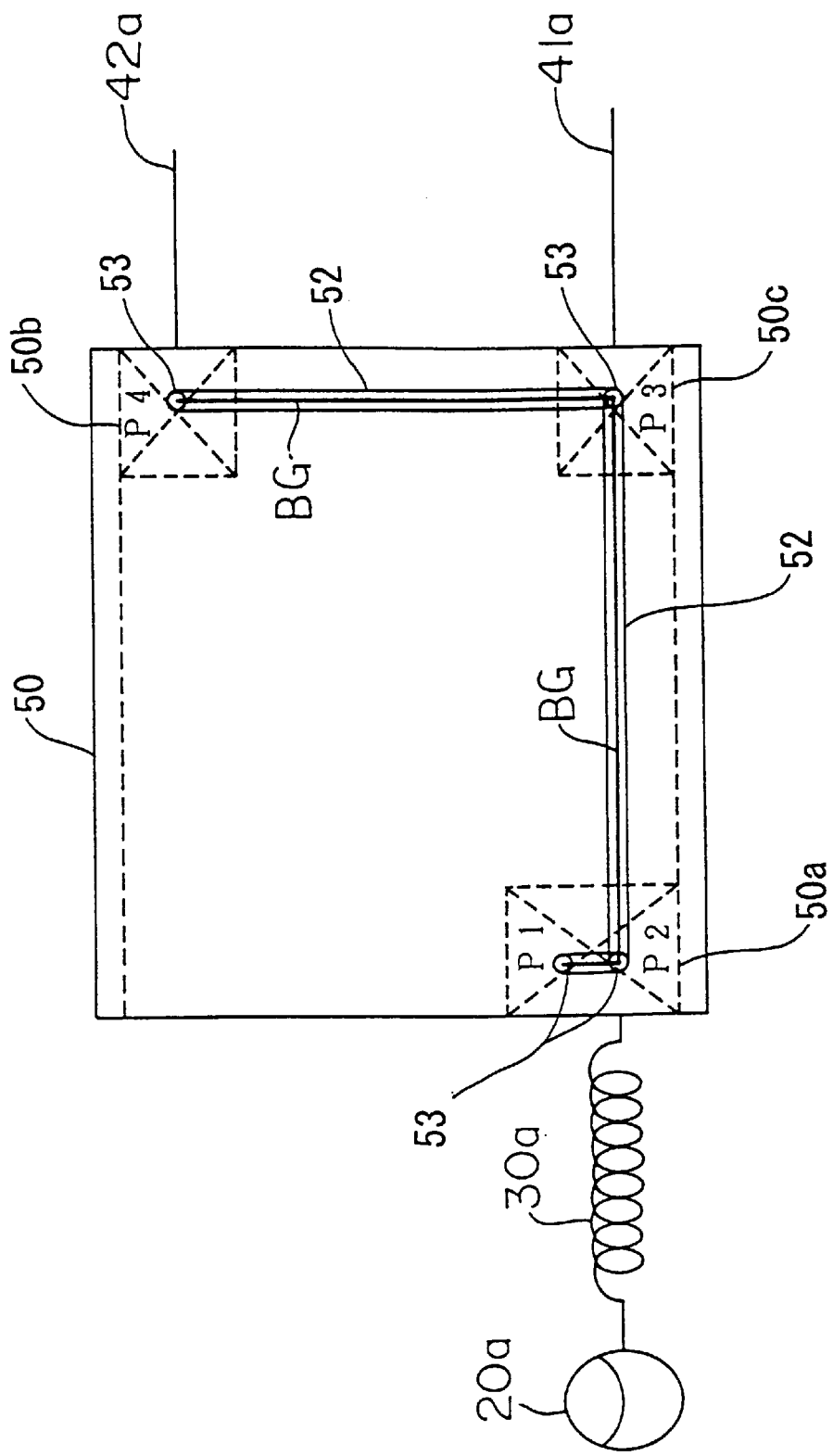
FIG. 6 is a bottom view of the telephone set.

FIGS. 5 and 6 are a side section view and a bottom view of a telephone set, respectively. In terms of the basic elements defined in FIG. 1, a handset 20a is an HMI unit and a flexible coiled cord 30a serves as an HMI cable to connect the handset 20a to the main body of a telephone set 50. A TCI cable 41a extends from the telephone set 50 to a public telephone service or private branch exchange (PBX). For utility functions such as automatic answering, the telephone set 50 is supplied with AC power via a PLI cord 42a. The telephone set 50 contains an internal control circuit 51 consisting of a printed-circuit board 51a, on which various electronic devices including drivers and receivers are mounted. As indicated by rectangles with diagonal lines, common-mode rejection filters 50a–50c are also mounted on the board 51a at its three corners from which the cables and cord extend.

The telephone set 50 has no frame ground FG and is entirely floating (or non-grounded), because its housing is usually made of plastics that have no conductivity. A groove 52 runs on the bottom surface of body to house a bypass circuit BG providing a minimum-length straight interconnection of the high-frequency junction points P1–P4, where high-frequency components splitting off from the common-mode rejection filters 50a–50c may pass through. At the both ends of and other two points on the groove 52, four holes 53 are bored to make connection for the high-frequency junction points P1–P4. This practical structure for the BG connection enables the telecommunications terminal 50 to display its full performance of electromagnetic compatibility given by the present invention. Further, by using a coaxial cable or parallel-wire cord for the BG circuit, the terminal 50 can fight against the noise source having high-frequency components of over 100 MHz.

Next, the following description will present how the common-mode noise produced by an external source will be reduced.

Figure 33:
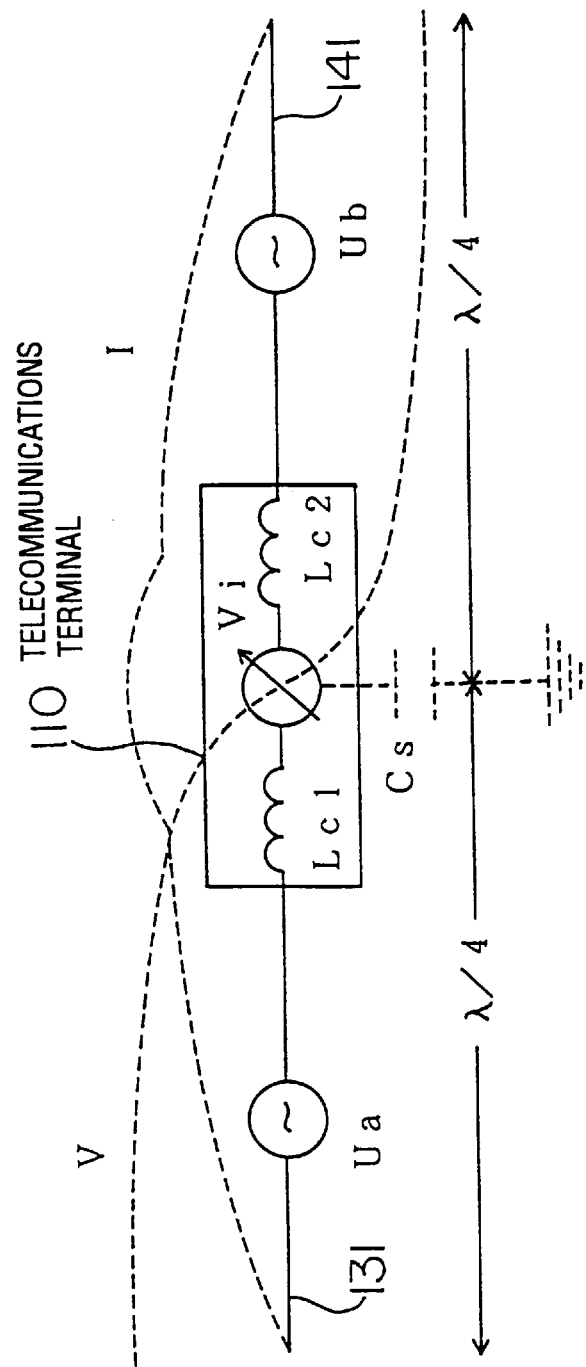
FIG. 33 is a diagram schematically representing a telecommunications terminal as an equivalent antenna system receiving electromagnetic noises.

In the prior-art description with reference to FIG. 33, it was clarified that the HMI cable 131 would resonate as a quarter-wavelength antenna element. The resonance in this case, however, must have a seemingly-low frequency because the common-mode choke coils Lc1 and Lc2 operate as loading coils that virtually extend the length of the HMI cable 131 and TCI cable 141, respectively.

On the other hand, according to the structure shown in FIG. 2, the resonance frequency will shift to a higher one, because the common-mode choke coils Lc1 and Lc2 are short-circuited by the bypass circuit BG. This also means that the common-mode current makes a detour, without entering into the internal circuit of the telecommunications terminal 10. Due to a substantially zero impedance of the bypass circuit BG, the induced voltage is suppressed almost to zero.

Besides suppressing the external electromagnetic noise, the same circuit structure can reject electromagnetic interference by some noise sources inside the terminal 10. As a matter of fact, in the internal circuit 13 and its peripheral receivers and drivers, stray capacitance between wires and/or flux leakage does exist to some extent. Such capacitive and/or inductive coupling brings the internal noise signal to the cables and it will then be radiated from there. In the present embodiment, however, the bypass circuit BG makes a short-circuit between the cables, and thus the internal noise signal will be lead to this BG and never be radiated to outside.

Various embodiments of the present invention will be now described below. Since the following embodiments have basically the same structure as that of the first embodiment in FIG. 1, the description will focus on their distinctive points, while maintaining consistent reference numerals for the common elements. Suffixes a–k following the reference numeral "10" will distinguish the variations of the telecommunications terminal 10 shown in FIG. 1.

Figure 7:
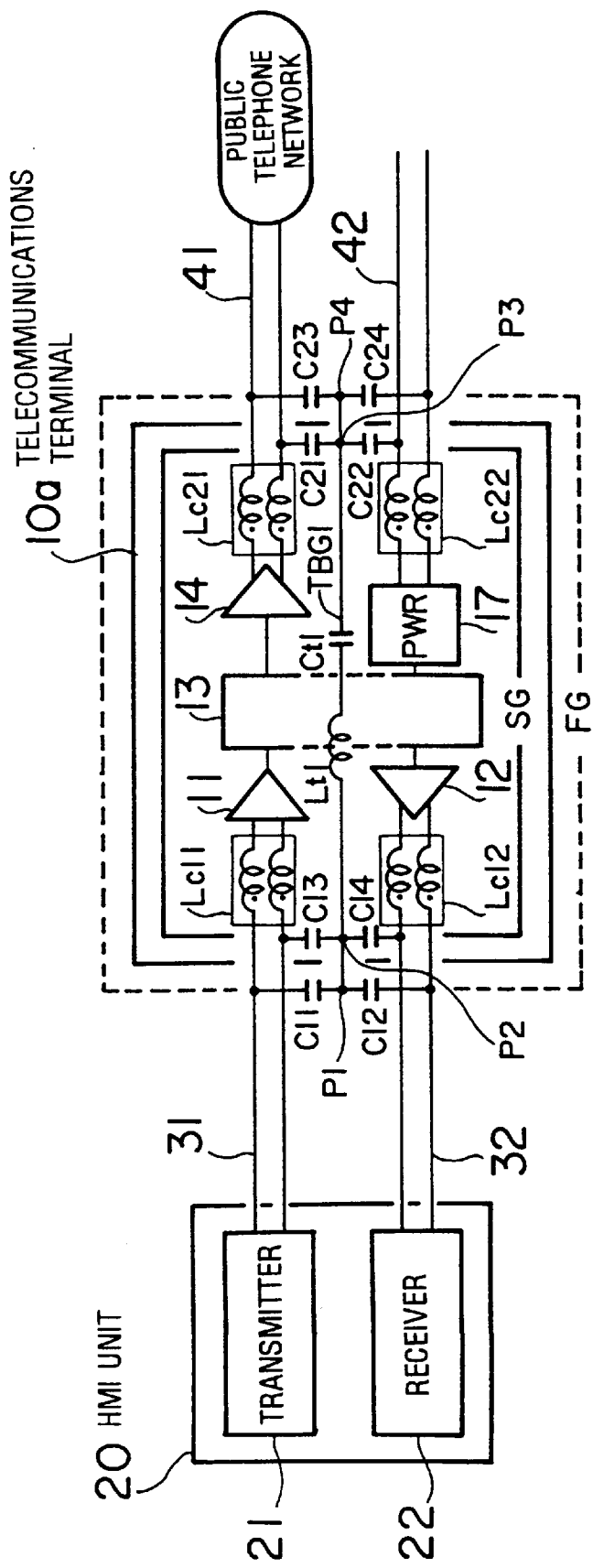
FIG. 7 is a diagram showing a system having a bypass circuit with a series resonance circuit.

FIG. 7 shows a telecommunications terminal 10a that has a series resonance circuit incorporated in its bypass circuit BG. This configuration is effective when a specific interference frequency is known, as in the case of CB radio interference. A series resonance circuit TBG1 tuned to the specific noise frequency will short-circuit the noise propagation path, thereby rejecting that noise frequency. This series-resonant circuit TBG1, which stands for "tuned bypass ground," consists of a coil Lt1 and a capacitor Ct1 and it is inserted in the middle of the bypass circuit BG.

In more detailed operation, the series resonance circuit TBG1 resonates with a common-mode noise signal at a specific resonance frequency fr expressed in the following formula:

$$fr = (2\pi (Lt1 \cdot Ct1)^{1/2})^{-1} \tag{1}$$

When the noise signal frequency agrees with this specific frequency fr, the series resonance provides the minimum circuit impedance. This resonance operation results in no noise voltage induction and thus suppresses the common-mode noise produced by the noise source having the specific frequency.

Figure 8:
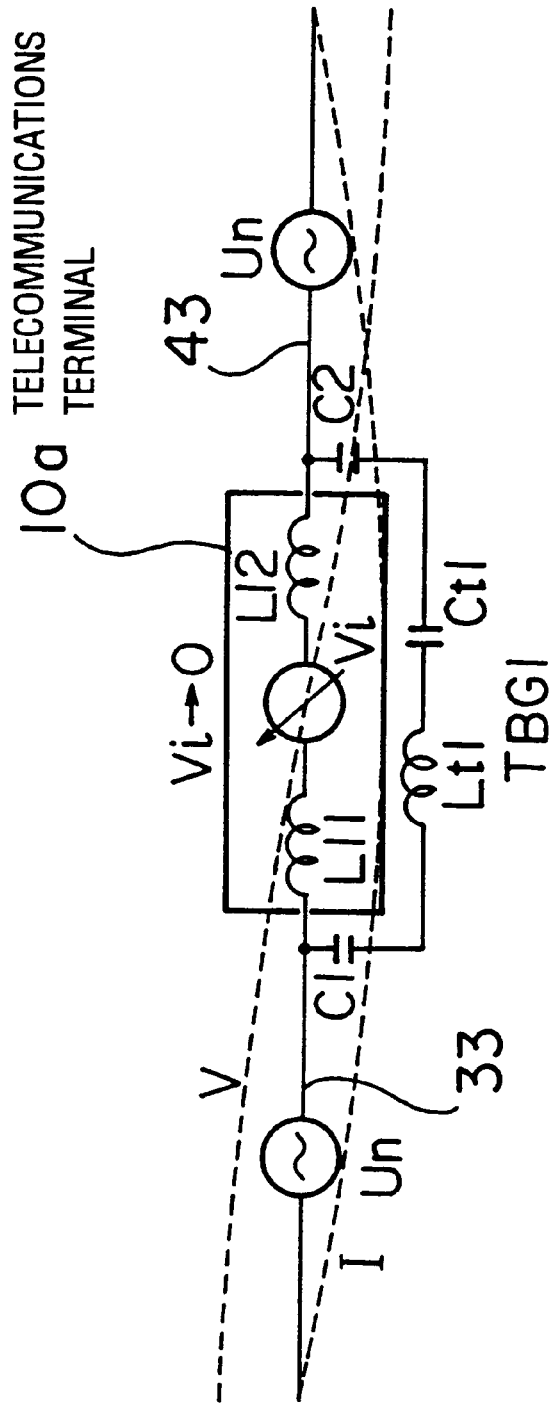
FIG. 8 is a diagram schematically representing a telecommunications terminal as an equivalent antenna system.

FIG. 8 is a simplified representation of the telecommunications terminal 10a working as an equivalent antenna system, where the HMI cable 33 and TCI cable 43 act as antenna elements. Since the series resonance circuit TBG1 shortcuts the path of external noise signals, standing waves will be produced in a different way from what is previously described. Thanks to the TBG1, the noise current makes a detour along the bypass circuit without entering the internal circuit.

Figure 9:
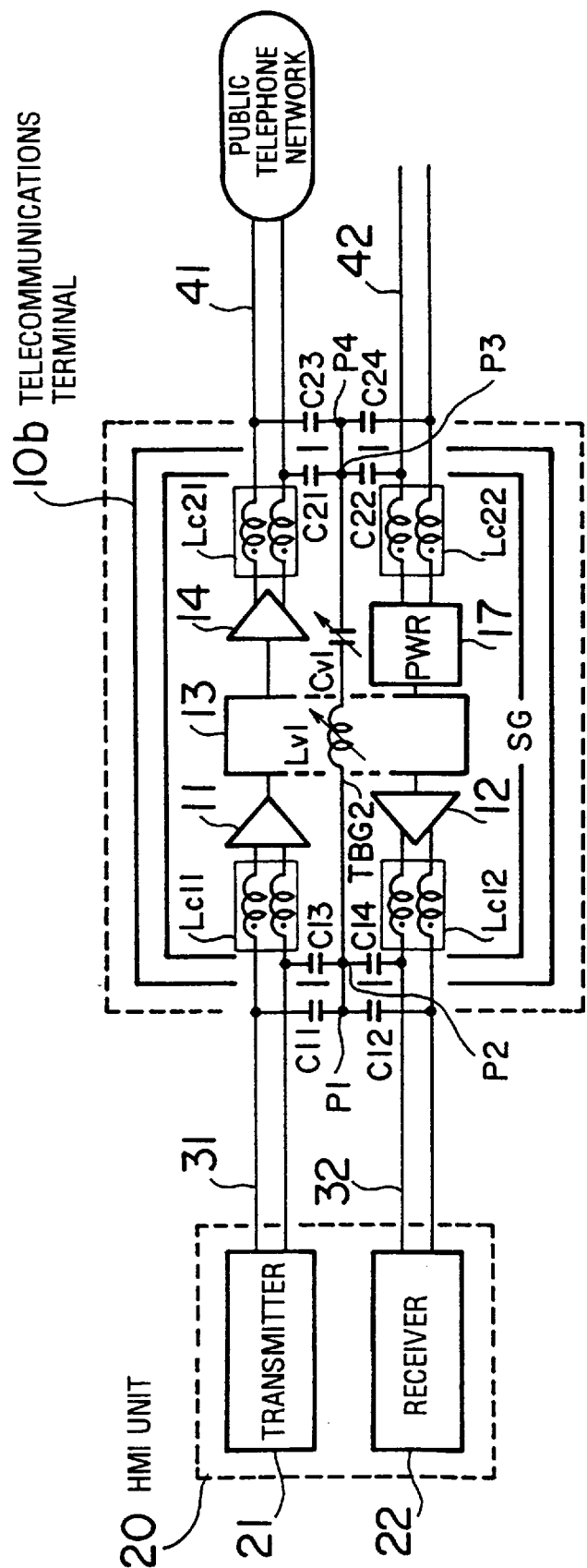
FIG. 9 is a diagram showing a terminal having a bypass circuit with a variable-impedance series resonance circuit.

FIG. 9 shows a telecommunications terminal 10b having another kind of series resonance circuit TBG2 incorporated in its bypass circuit BG. This series resonance circuit TBG2 consists of a variable-inductance coil Lv1 and a variable-capacitance capacitor Cv1, making the total impedance adjustable. By tuning the inductance and capacitance with a screw driver or some other tools, the resonance frequency can be precisely adjusted to the specific frequency component that is considered to be the most dominant among those in the external noise.

Figure 10:
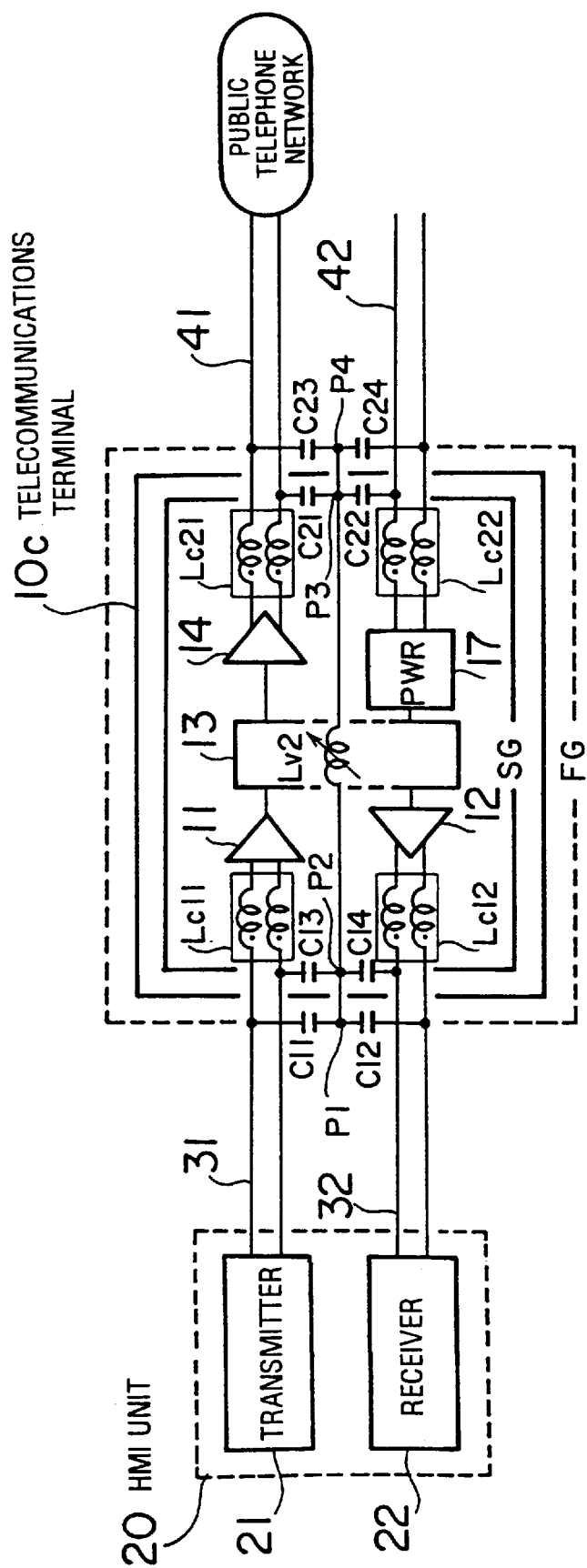
FIG. 10 is a diagram showing a terminal having a bypass circuit with a variable-inductance coil.

FIG. 10 shows a telecommunications terminal 10c having a variable-inductance coil Lv2 incorporated in its bypass circuit BG. In this case, combined capacitance of a plurality of capacitors C21–C24 for the second common-mode rejection filters will serve as part of the series resonance circuit. By tuning the inductance with a screw driver or some other tools, the resonance frequency can be adjusted to a specific frequency component of an external noise source. The configuration of FIG. 10 allows precise adjustment with fewer circuit components.

Figure 11:
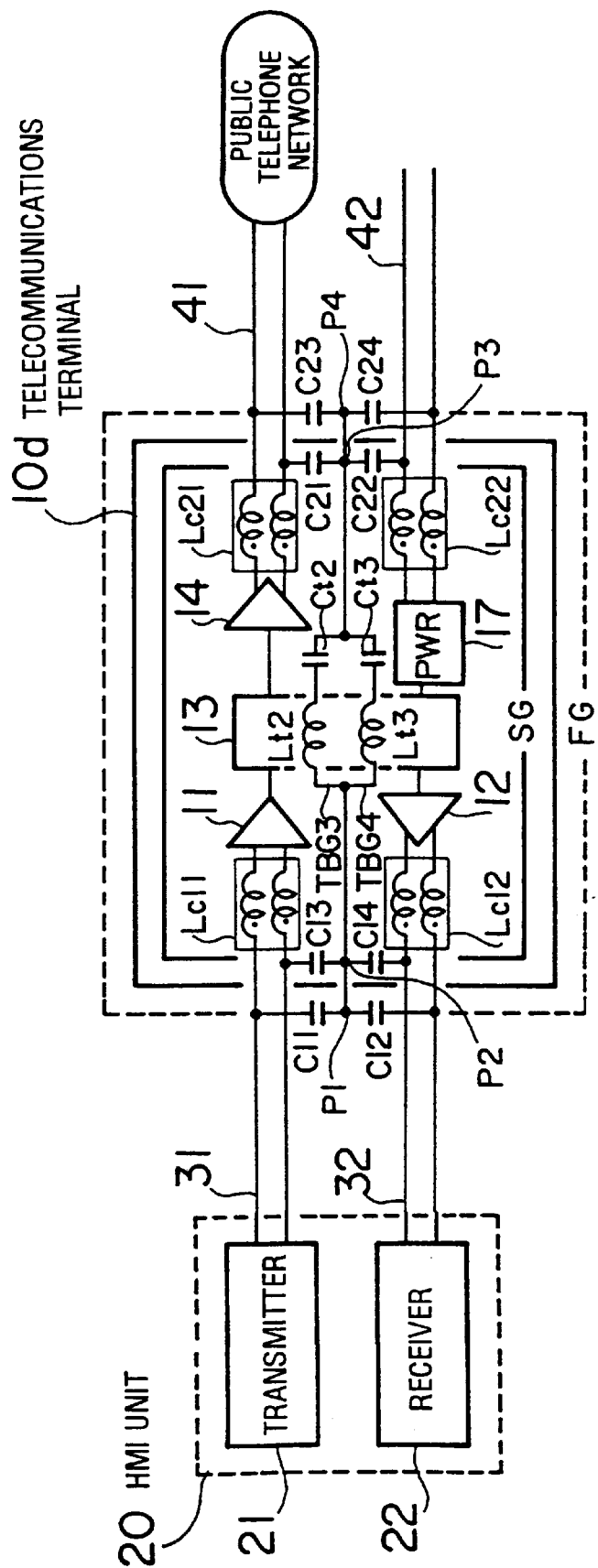
FIG. 11 is a diagram showing a terminal having a bypass circuit with dual series resonance circuits.

FIG. 11 shows a telecommunications terminal 10d having a bypass circuit with dual series resonance circuits to realize a stagger tuning. Such a configuration will effectively work when a plurality of noise frequencies have to be suppressed. Resonating at some different frequencies, the stagger-tuned circuit short-circuits the multiple-frequency noise signals. FIG. 11 shows two adjacent series resonance circuits TBG3 and TBG4, which consist of a coil Lt2 and a capacitor Ct2, and a coil Lt3 and a capacitor Ct3, respectively. Their respective resonance frequencies fr1 and fr2 are obtained with the following formulas:

$$fr1 = (2\pi(Lt2 \cdot Ct2)^{1/2})^{-1} \quad (2a)$$

$$fr2 = (2\pi(Lt3 \cdot Ct3)^{1/2})^{-1} \quad (2a)$$

Since the series resonance circuits TBG3 and TBG4 resonate at the different resonance frequencies fr1 and fr2, the response of this stagger-tuned circuit shows two different minimum points where the circuit impedance becomes substantially zero. This will result in no noise voltage induction and thus suppress the specific noise frequencies. This stagger-tuned configuration is particularly useful when the noise spectrum have some peaks separated at different frequency ranges.

Figure 12:
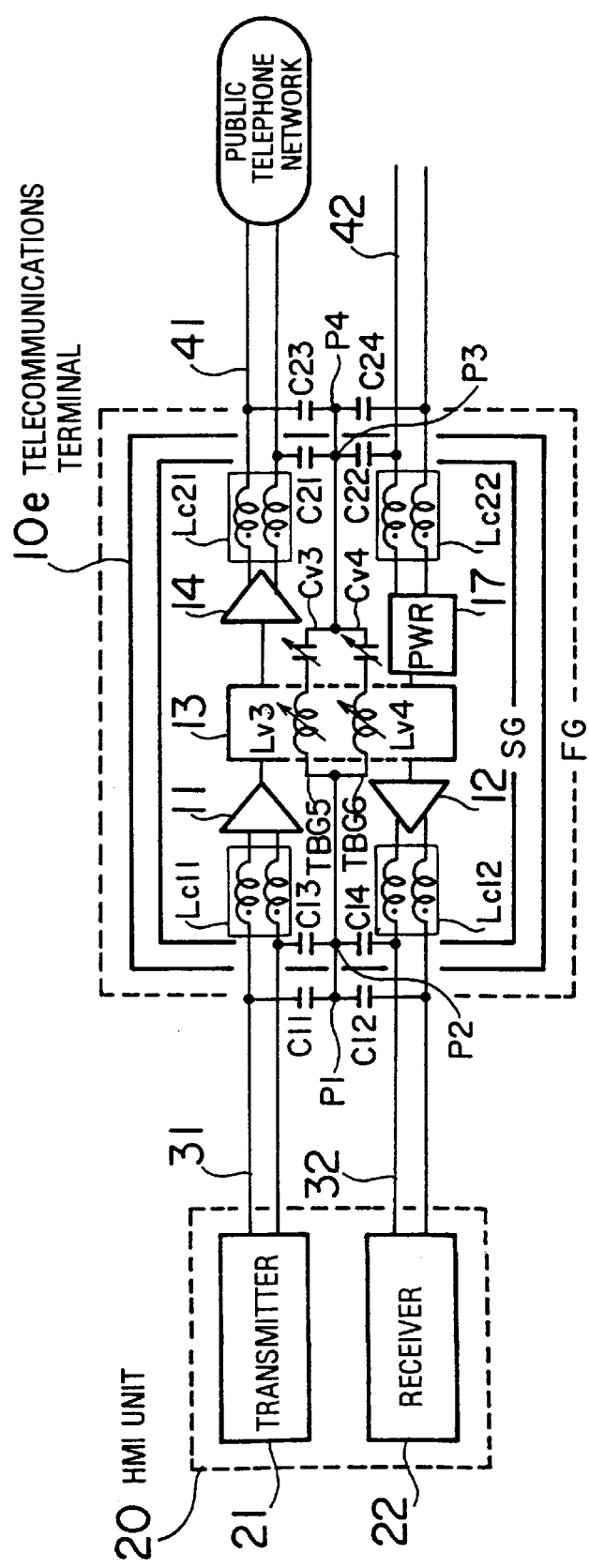
FIG. 12 is a diagram showing a terminal having a bypass circuit with dual variable-impedance series resonance circuits.

FIG. 12 shows a telecommunications terminal 10e having a bypass circuit BG with dual variable-impedance series resonance circuits TBG5 and TBG6. The series resonance circuits TBG5 and TBG6 are organized by variable-inductance coils Lv3 and Lv4 and variable-capacitance capacitors Cv3 and Cv4, thus making it possible to adjust the resonance frequency. By tuning the inductance and capacitance with a screw driver or some other tools, the resonance frequency can be precisely adjusted to a plurality of specific noise frequencies from an external source.

Figure 13:
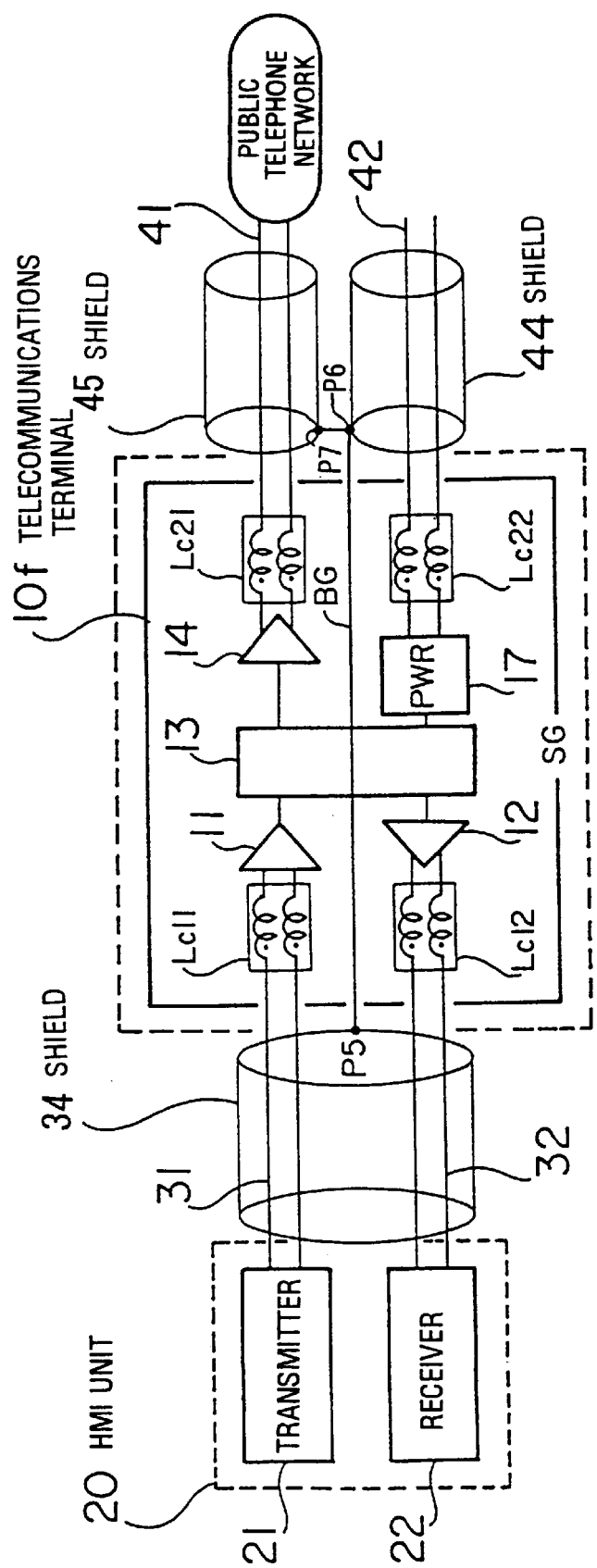
FIG. 13 is a diagram showing a telecommunications terminal with shielded cables.

FIG. 13 shows a telecommunications terminal 10f that has adapted shielded cables for the HMI cables 31 and 32, TCI cable 41, and PLI cord 42. More specifically, the HMI cables 31 and 32 are put together within a first shield 34, and the TCI cable 41 and PLI cord 42 are covered with second shields 45 and 44, respectively. The first shield 34 and second shields 44 and 45 are connected with the bypass circuit BG at three junction points P5–P7. In this configuration, each cable and its corresponding shield conductor are regarded as being substantially combined through capacitive coupling, concerning a common-mode current running along the cable. The short-circuited first and second shield conductors will act as part of the common-mode rejection filters described in FIG. 1.

Figure 14:
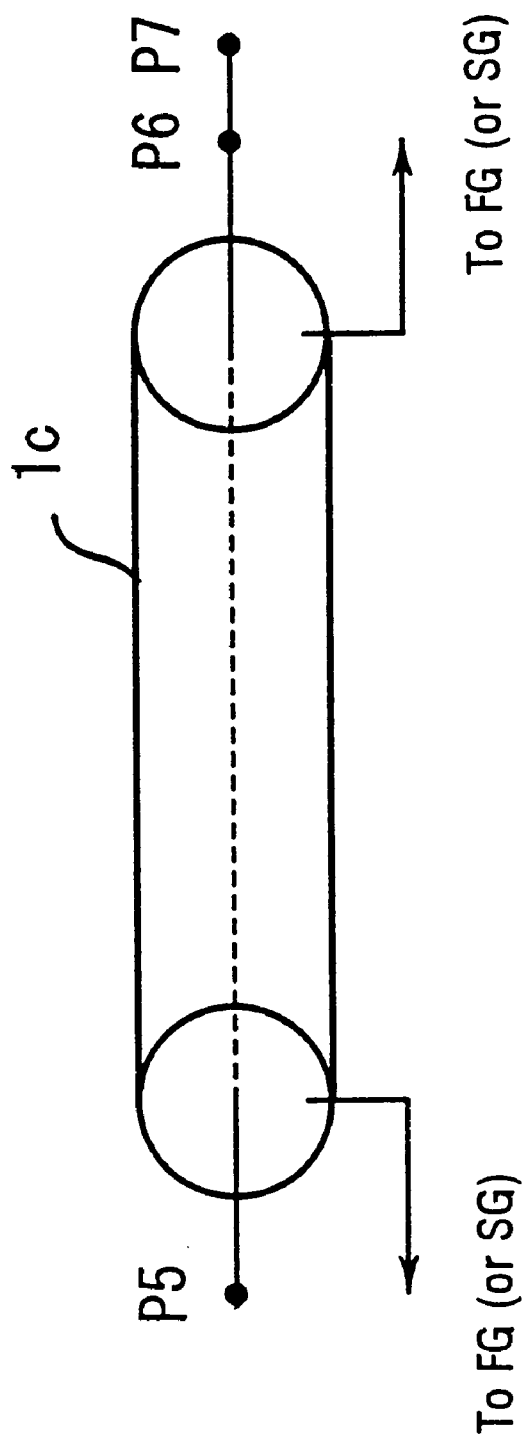
FIG. 14 is a diagram showing a bypass circuit BG constructed with a coaxial cable.
Figure 15:
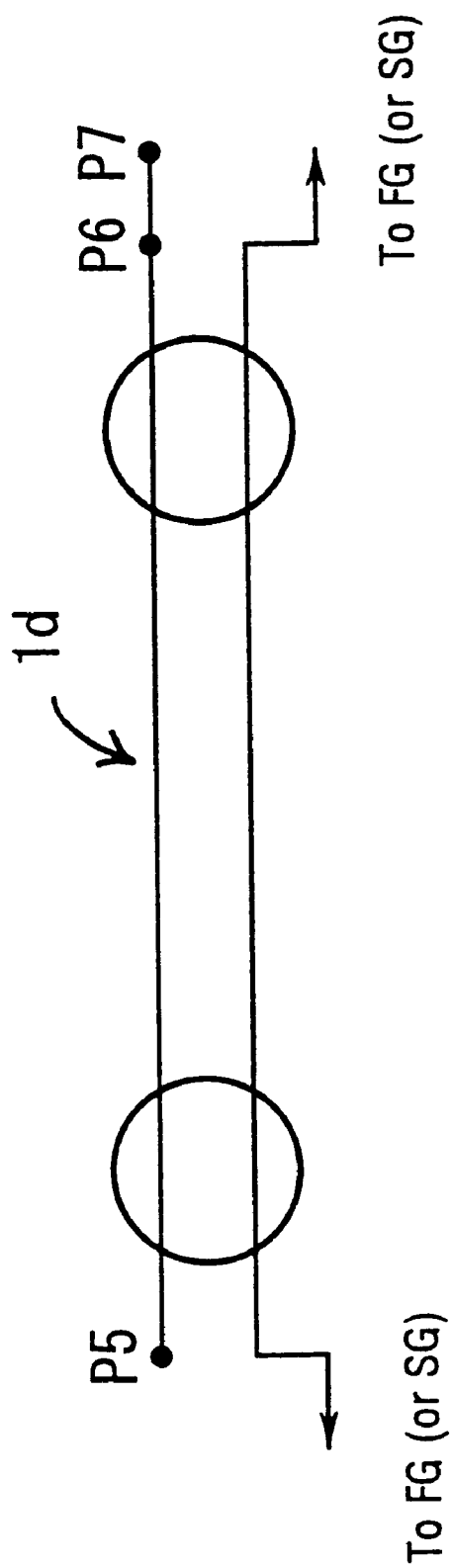
FIG. 15 is a diagram showing a bypass circuit BG constructed with a parallel-wire transmission line.

In the same way as explained in FIGS. 3 and 4, the bypass circuit BG can be constructed with a distributed-constant transmission line so as to cope with high-frequency noise sources. FIG. 14 shows a coaxial cable used for the BG. The inner conductor of the coaxial cable 1c serves as the BG conductor to interconnect the shields at P5–P7, while its outer conductor is used to connect the frame ground FG or the signal ground SG of the terminal 10f at both ends of the cable. FIG. 15, on the other hand, shows the case that the BG is constructed with a parallel-wire transmission line 1d. One lead is used for the BG to interconnect the shields at the junction points P5–P7, while the other is used to connect the FG or SG at both ends thereof. Those two BG arrangements will cope with the noise source having high-frequency components of above 100 MHz.

Figure 16:
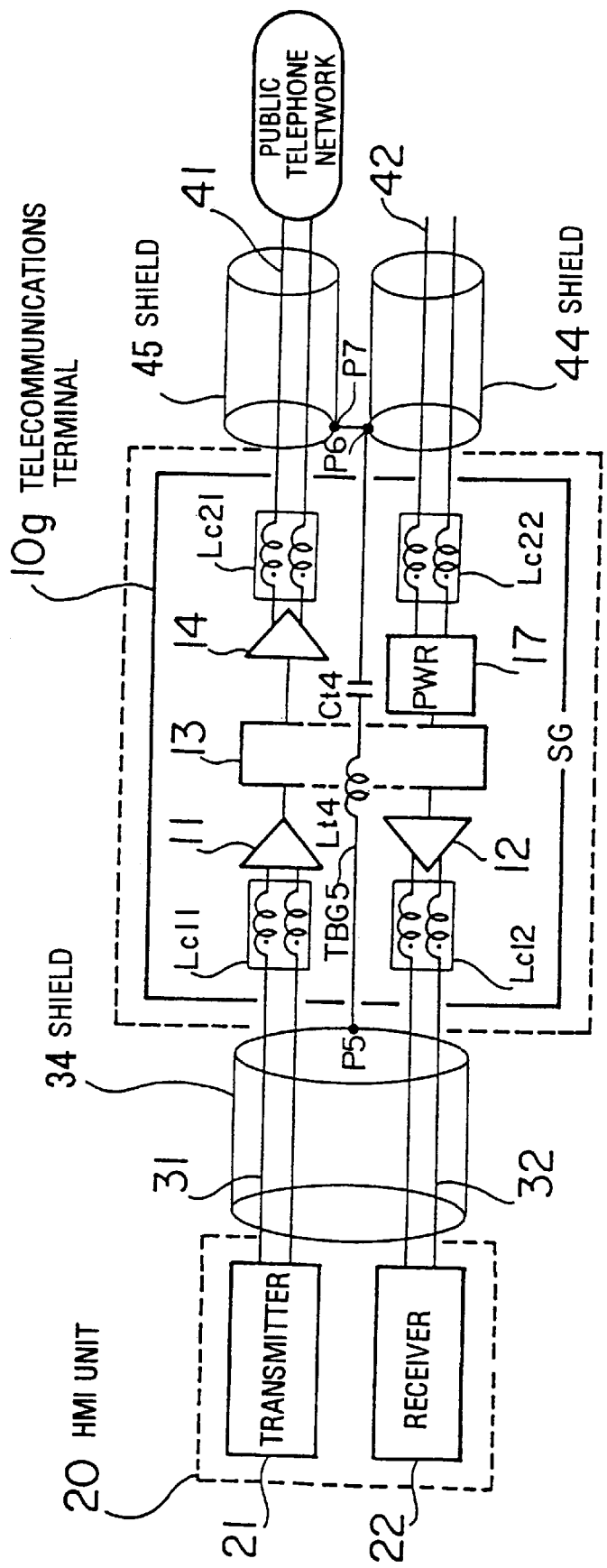
FIG. 16 is a diagram showing a telecommunications terminal in which shielded connection cables are used and a bypass circuit incorporates a series resonance circuit.

FIG. 16 is a variation of FIG. 13, where a series resonance circuit TBG5 is located in the middle of the bypass circuit BG. The series resonance circuit TBG5 consisting of a coil Lt4 and a capacitor Ct4 will selectively reject a specific frequency component, while other components are rejected by the shields. The common-mode noise can be thus eliminated more effectively.

Figure 17:
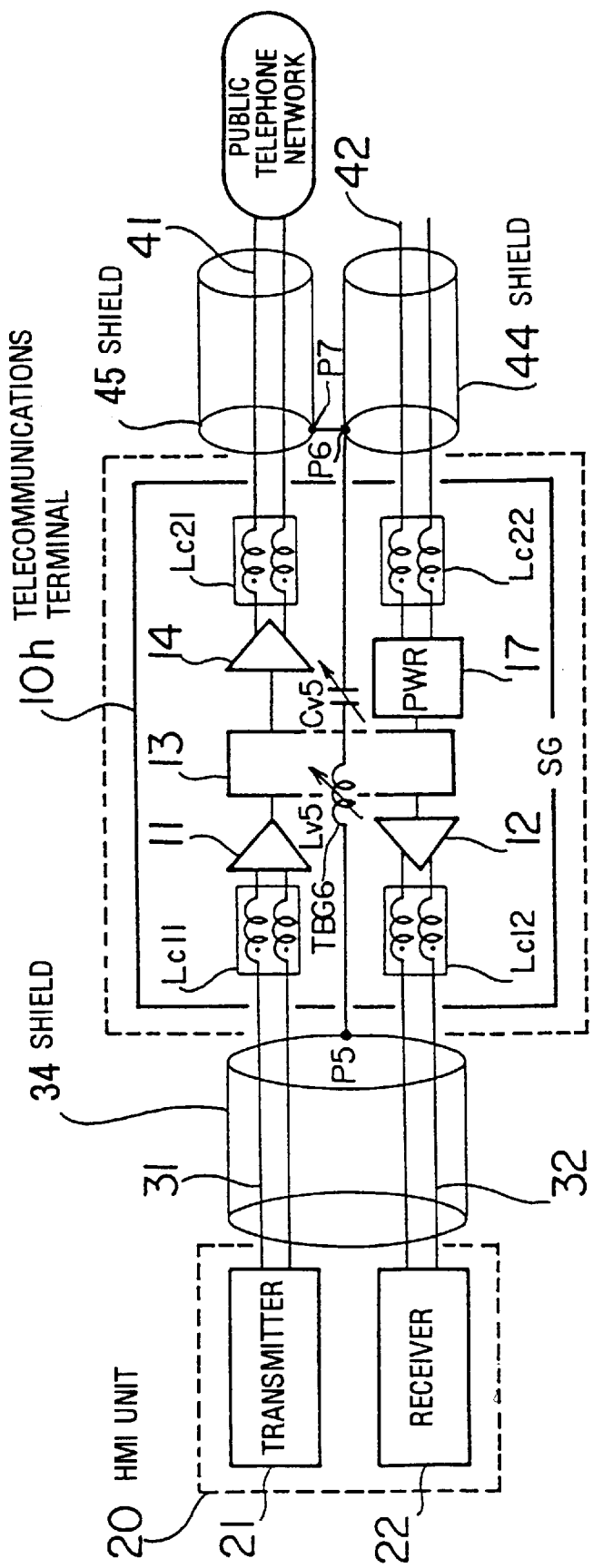
FIG. 17 is a diagram showing a telecommunications terminal in which shielded connection cables are used and a bypass circuit incorporates a variable-impedance series resonance circuit.

FIG. 17 is another variation of FIG. 13, where a variable-impedance series resonance circuit TBG6 is located in the middle of the bypass circuit BG. This TBG6 consists of a variable-inductance coil Lv5 and a variable-capacitance capacitor Cv5, thereby making its total impedance adjustable. In addition to the effect of shielding, this structural arrangement provides precise tuning of the resonance frequency so as to deal with a specific frequency component in the noise signal, by adjusting the inductance and capacitance of the TBG6 with a screw driver or some other tools.

Figure 18:
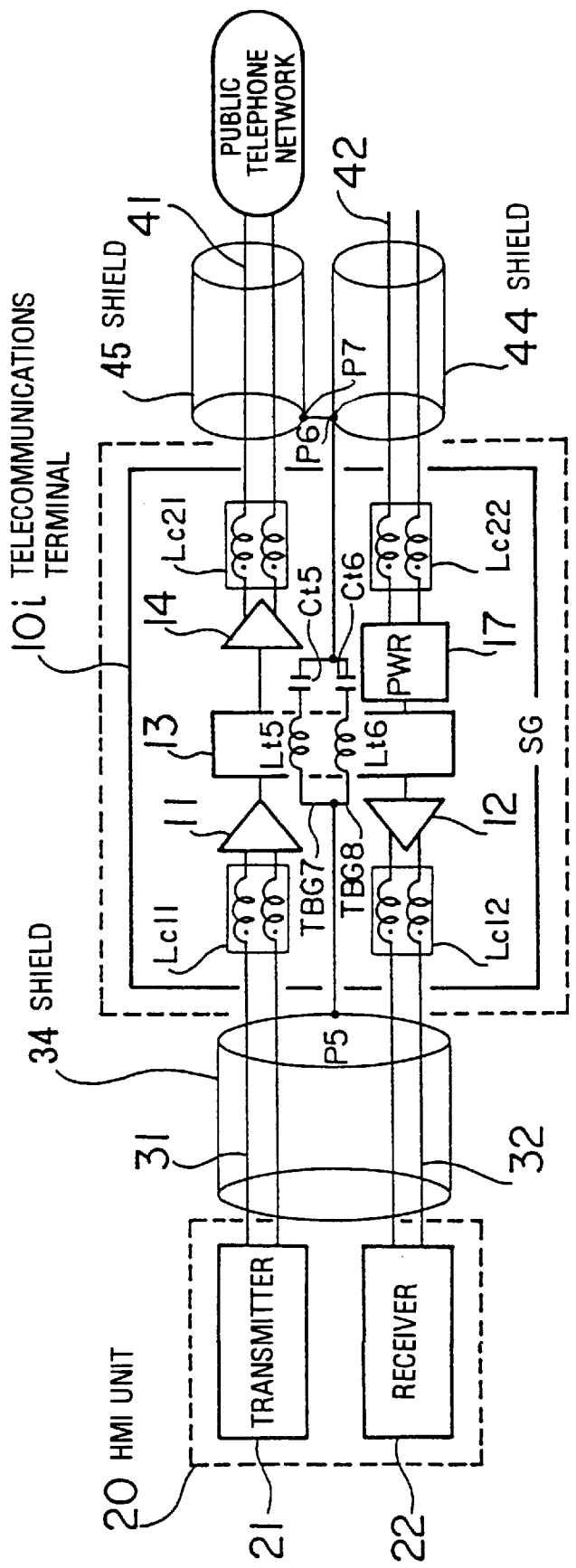
FIG. 18 is a diagram showing a telecommunications terminal in which shielded connection cables are used and a bypass circuit incorporates dual series resonance circuits arranged in parallel.

FIG. 18 is still another variation of FIG. 13, in which two adjacent series resonance circuits are inserted into the bypass circuit BG. Series resonance circuits TBG7 and TBG8 consist of a coil Lt5 and a capacitor Ct5, and a coil Lt6 and a capacitor Ct6, respectively. Besides enjoying the shield effect, this configuration can suppress a plurality of specific frequencies coming from an external noise source.

Figure 19:
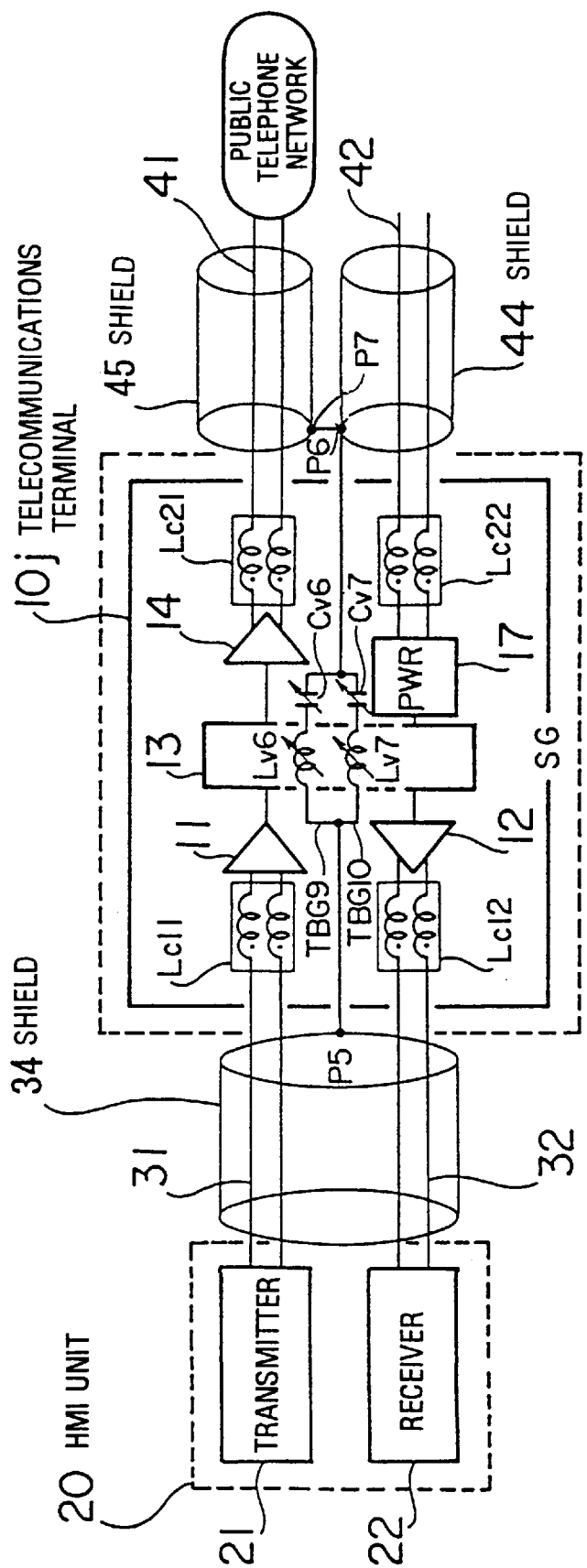
FIG. 19 is a diagram showing a telecommunications terminal in which shielded connection cables are used and a bypass circuit incorporates dual variable-impedance series resonance circuits arranged in parallel.

FIG. 19 shows a further variation of FIG. 13, in which two adjacent series resonance circuits TBG9 and TBG10 are inserted into the bypass circuit BG. The two series resonance circuits TBG9 and TBG10 are organized by variable-inductance coils Lv6 and Lv7 and variable-capacitance capacitors Cv6 and Cv7, thus making it possible to adjust the resonance frequency. By tuning the inductance and capacitance with a screw driver or some other tools, the resonance frequency can be precisely adjusted to a plurality of specific frequencies from an external noise source.

Figure 20:
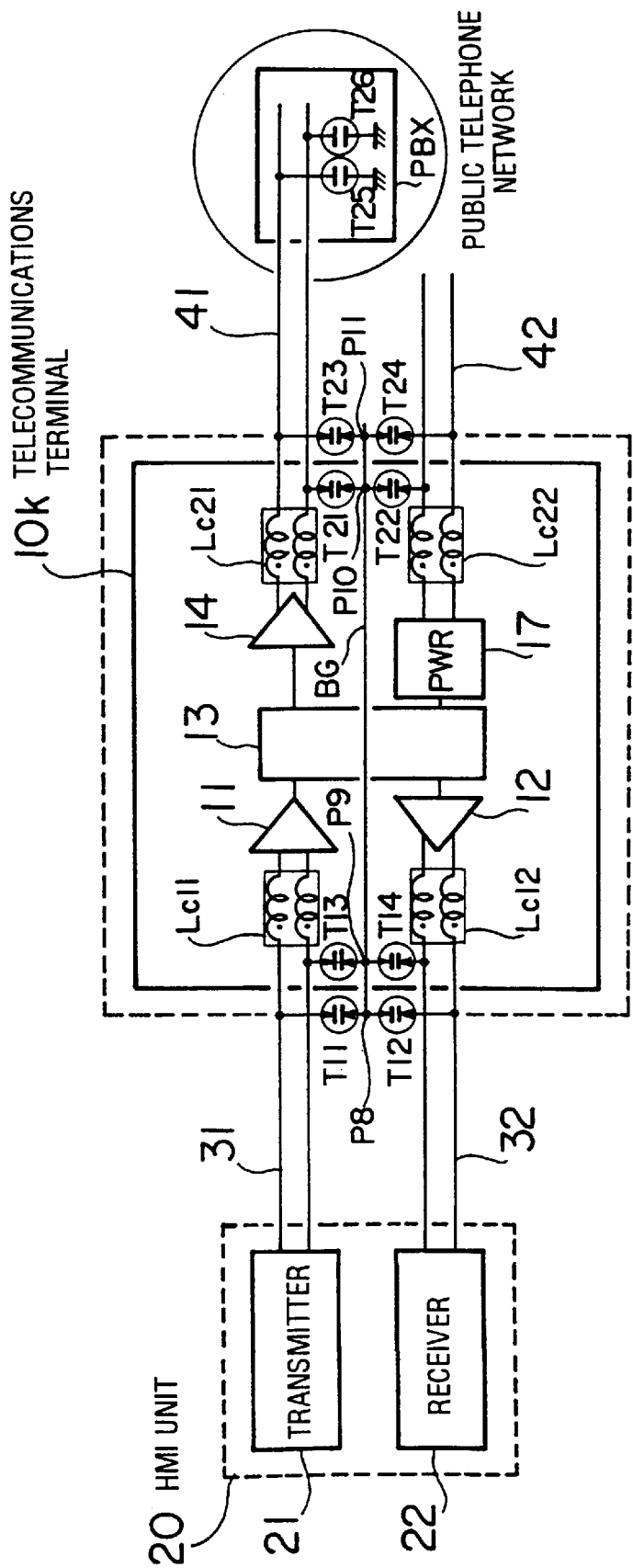
FIG. 20 is a diagram showing a telecommunications terminal with discharge elements.

FIG. 20 shows a telecommunications terminal 10k in which discharge elements are used instead of capacitors for common-mode rejection filters. First common-mode rejection filters are constructed at the near end of the HMI cables 31 and 32 with common-mode choke coils Lc11 and Lc12 and discharge elements T11–T14. Second common-mode rejection filters are constructed at the near end of the TCI cable 41 and PLI cord 42 with common-mode choke coils Lc21 and Lc22 and discharge elements T21–T24. First high-frequency junction points P8 and P9 and second high-frequency junction points P10 and P11 are interconnected by a bypass circuit BG. The noise source assumed in this configuration is not radio waves but electrostatic discharge and lightning. The discharge elements provide a discharge path for a noise current caused by those sources.

Electrostatic discharge can sometimes happen when a human body charged up with static electricity makes a contact with an HMI device such as a handset and keyboard. In conventional equipment, this electrostatic noise current travels on cables, passes through the internal circuit 13, and flows into ground via protectors on a public telephone network or discharge elements T25, T26 in a local PBX facility.

However, the terminal 10k in FIG. 20 has discharge elements T11–T14 and T21–T24 at the connection points of the cables and they are interconnected by the bypass circuit BG. Therefore, the electrostatic noise signal on the HMI cable 31 will not pass through the internal circuit 13 but detour along the bypass circuit BG and finally be grounded via protectors on a public telephone network or discharge elements T25 and T26 in a local PBX facility. As such, the noise signal caused by electrostatic discharge or lightning will never affect the internal circuit 13 of the terminal 10k.

As described in FIGS. 3 and 4, the bypass circuit BG may be constructed with a distributed-constant transmission line.

Figure 21:
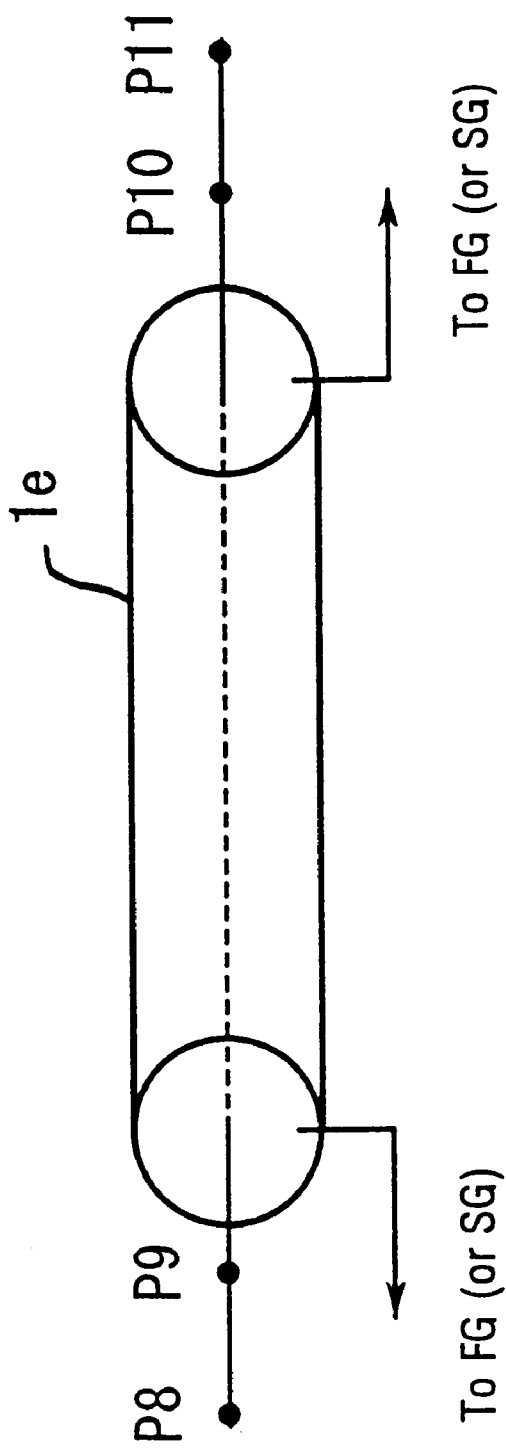
FIG. 21 is a diagram showing a bypass circuit BG constructed with a coaxial cable.
Figure 22:
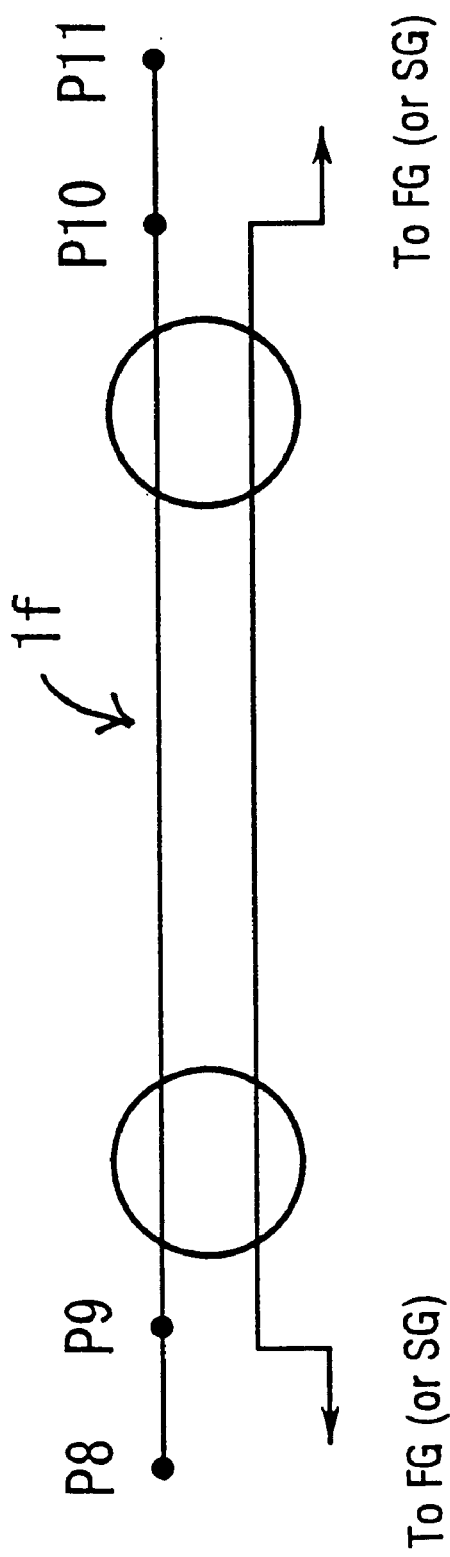
FIG. 22 is a diagram showing a bypass circuit BG constructed with a parallel-wire transmission line.

FIG. 21 shows a coaxial cable 1e used for the BG. The inner conductor of the coaxial cable 1e is used as the BG conductor at junction points P8–P11, while the outer conductor is used to connect the frame ground FG (not shown) or signal ground SG of the terminal 10k at both ends thereof. FIG. 22 shows the BG constructed with a parallel-wire transmission line 1f. One lead is used for the BG connection at the junction points P8–P11, while the other one is used to connect the FG or SG at both ends thereof. The electrostatic noise is an impulse signal having a broadband spectrum by nature. However, the above-described arrangement can bypass the signal energy without leaking it to outside of the terminal.

Figure 23:
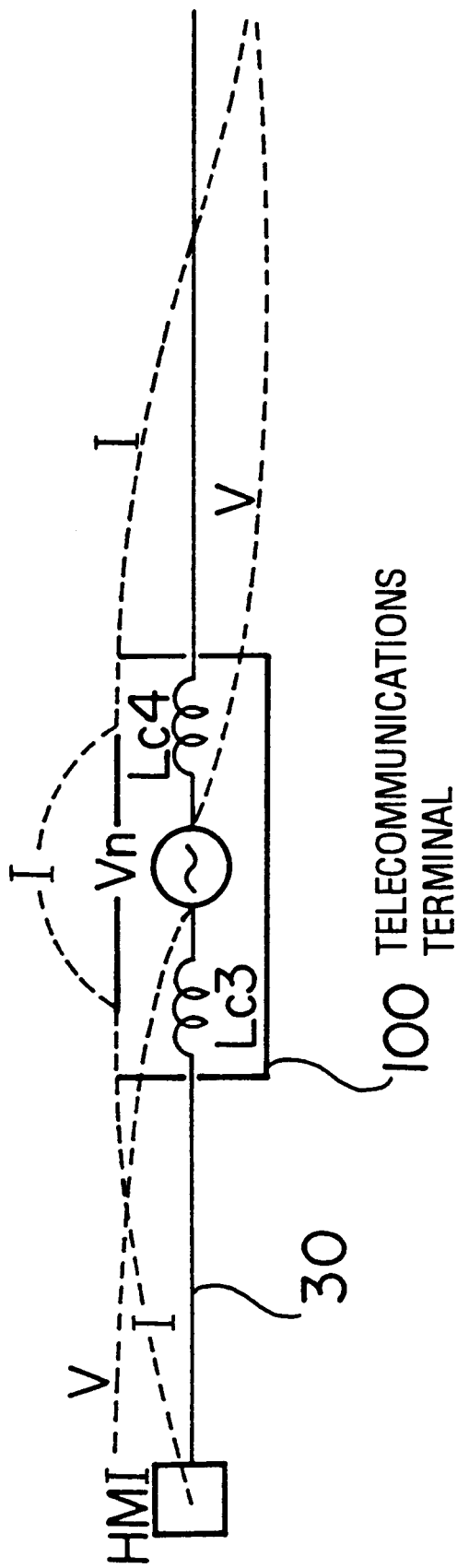
FIG. 23 is a diagram schematically representing a telecommunications terminal as an equivalent antenna system with resonance frequency f0.

The following description will now explain about common-mode noise emission from an internal noise source in a telecommunications terminal 100 in comparison with the prior-art cases. Such noise emission disperses spurious frequencies to outside of the terminal 100. FIG. 23 is a simplified expression of the terminal 100 as an equivalent antenna system, illustrating spurious radiation from the HMI cable 30. In this model, a voltage source Vn represents an internal noise source in the terminal 100.

Spurious signals generated from this internal noise source Vn are likely to produce standing waves on the equivalent antenna matching with any odd multiple of quarter-wavelength (i.e., $\lambda/4$, $3\lambda/4$, $5\lambda/4$, $7\lambda/4$, ...). FIG. 23 specifically shows how the equivalent antenna radiates a particular noise frequency component in the $\lambda/4$ resonance mode. Since the common-mode choke coil Lc3 serves as a loading coil to extend the length of the HMI cable 30, its fundamental resonance frequency f0 is determined by the combined length of the HMI cable 30 and the coil Lc3 as being equal to $\lambda/4$.

Figure 24:
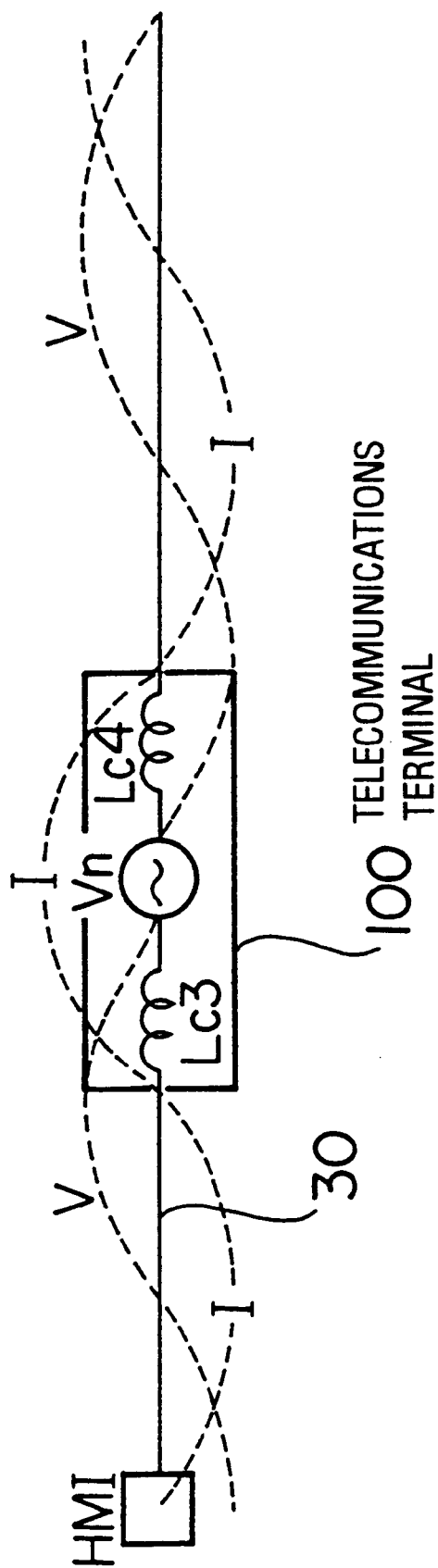
FIG. 24 is a diagram schematically representing a telecommunications terminal as an equivalent antenna system with resonance frequency 3f0.
Figure 25:
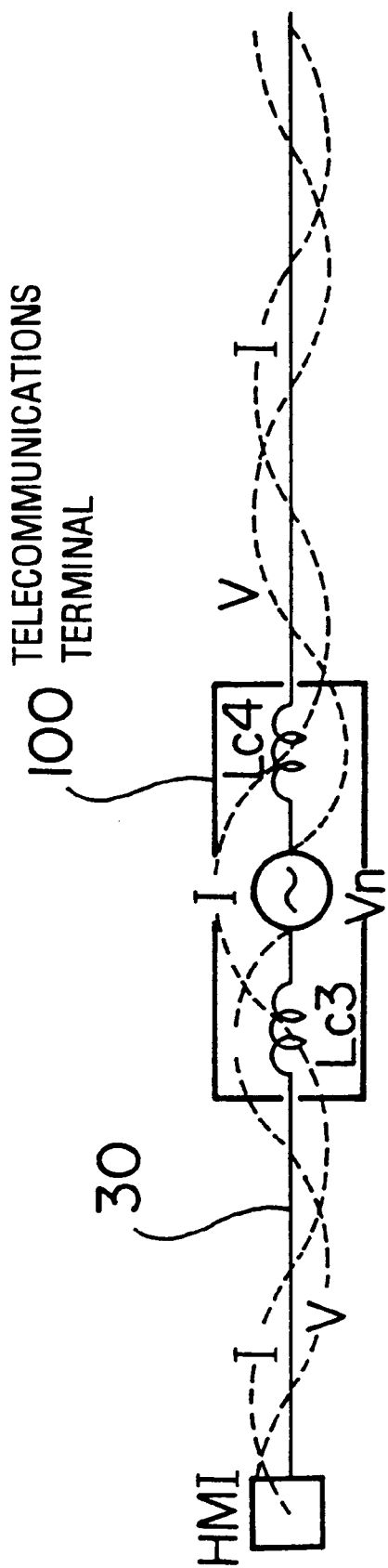
FIG. 25 is a diagram schematically representing a telecommunications terminal as an equivalent antenna system with resonance frequency 5f0.

FIG. 24 shows another standing wave developed on the HMI cable 30 in the $3\lambda/4$ resonance mode, by which a particular spurious radio wave at the resonance frequency 3f0 is strongly radiated. Likewise, FIG. 25 shows a standing wave in the $5\lambda/4$ resonance mode, where the resonance frequency is 5f0.

Figure 26:
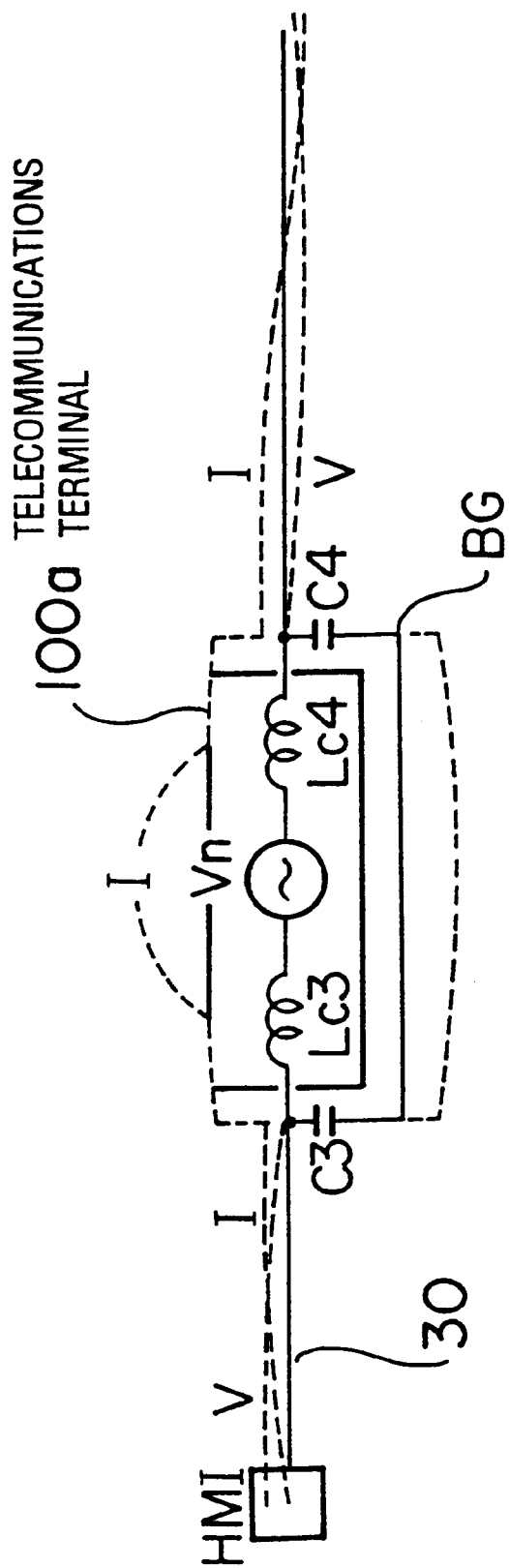
FIG. 26 is a diagram schematically representing a telecommunications terminal having a bypass circuit as an equivalent antenna system with resonance frequency fo.

The present invention will reduce the outward spurious radiation in the following manner. FIG. 26 illustrates reduced radiation of a common-mode noise signal at resonance frequency f0. In this improved configuration of a telecommunications terminal 100a, two cables working as equivalent antennas are connected to the bypass circuit BG by capacitive coupling through capacitors C3 and C4. When compared with those in FIG. 23, the voltage distribution curve V and current distribution curve I in FIG. 26 show a great reduction in noise emission. Since it is hard to realize a perfect zero impedance of the bypass circuit BG, a little leakage noise current may remain. However, most of this remaining leakage current returns to the bypass circuit BG and it hardly appears on the HMI cable 30. This results in a great reduction of the total energy of spurious radiation from the HMI cable 30 that is working as an antenna.

Figure 27:
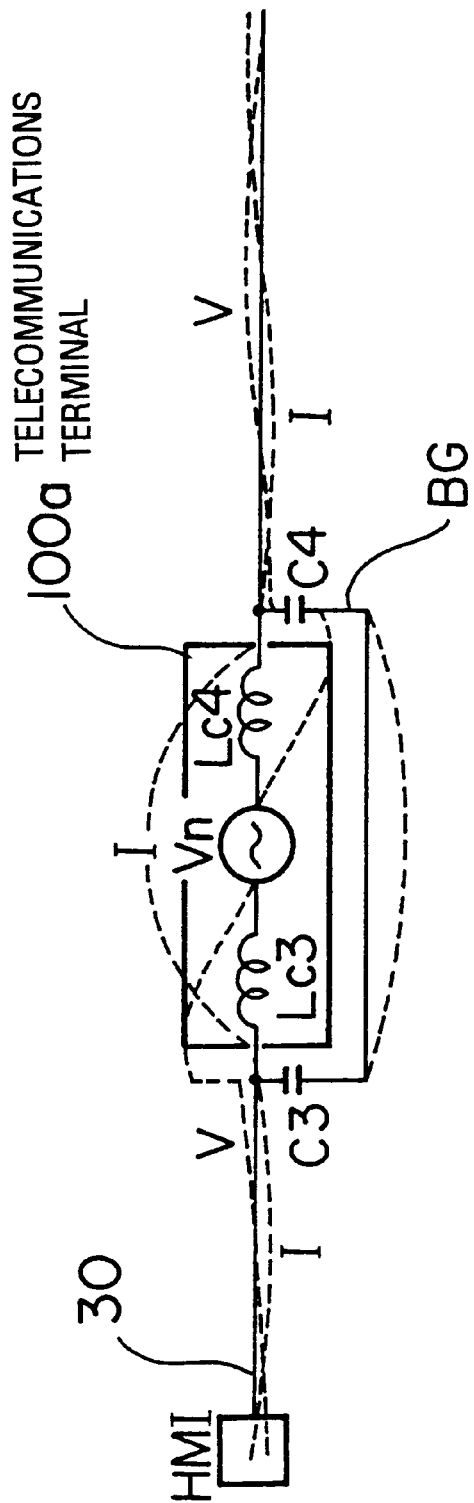
FIG. 27 is a diagram schematically representing a telecommunications terminal having a bypass circuit as an equivalent antenna system with resonance frequency 3f0.
Figure 28:
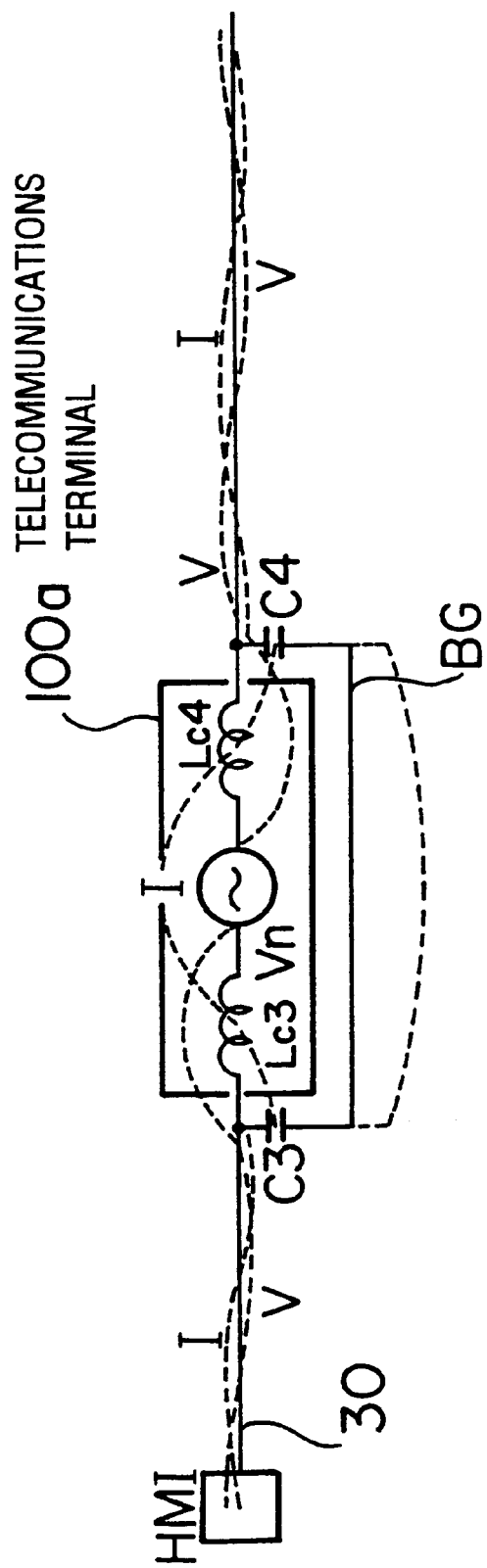
FIG. 28 is a diagram schematically representing a telecommunications terminal having a bypass circuit as an equivalent antenna system with resonance frequency 5f0.

FIG. 27 shows voltage and current distributions at another resonance frequency 3f0, indicating a drastic reduction in common-mode noise radiation in comparison with FIG. 24. Likewise, FIG. 28 presents voltage and current distributions at resonance frequency 5f0, showing a great noise reduction in comparison with FIG. 25.

Figure 29:
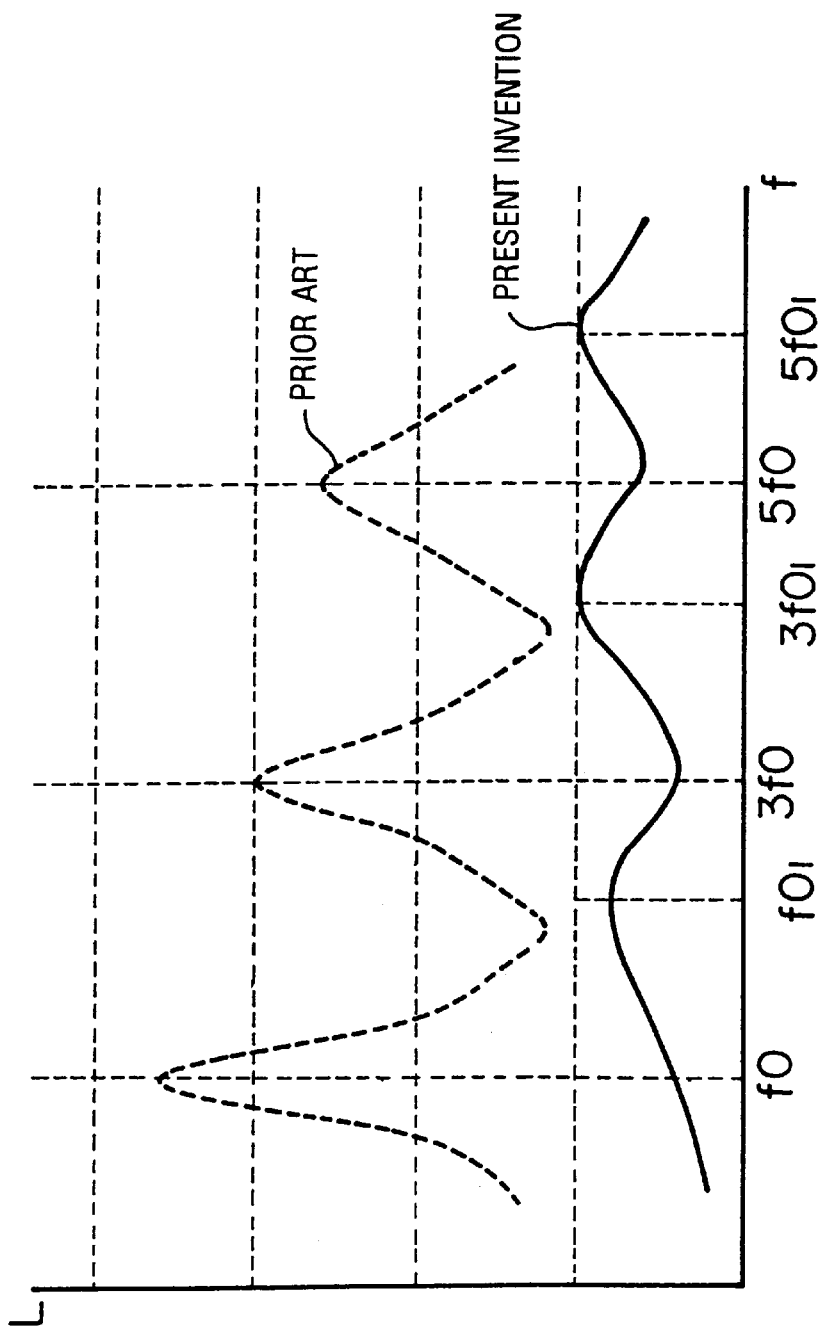
FIG. 29 is a diagram showing a comparison between conventional telecommunications terminal equipment and new equipment having a bypass circuit, in terms of the strength of spurious radiation or the level of externally induced noise signals.
Figure 30:
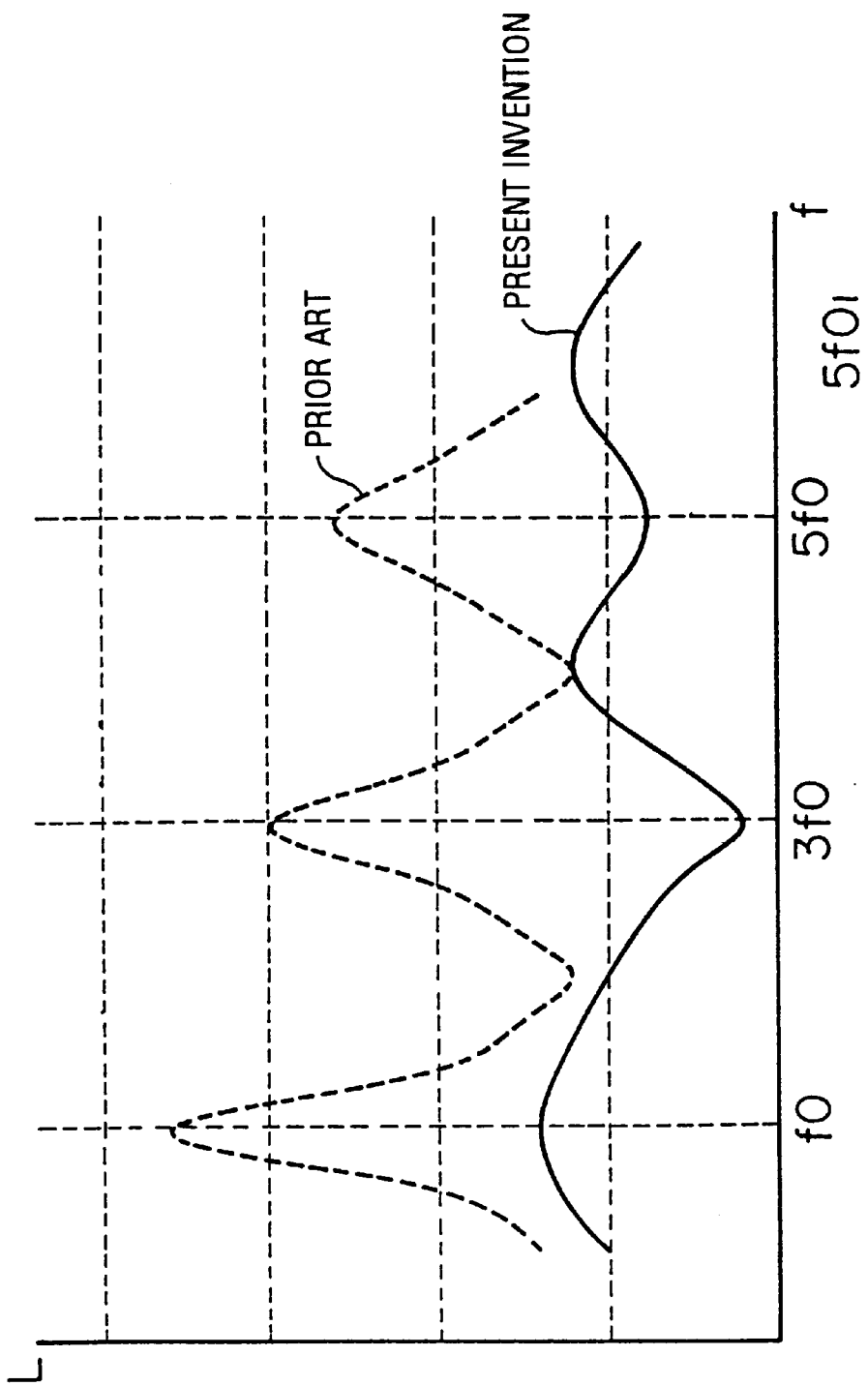
FIG. 30 is a diagram showing a comparison between conventional telecommunications terminal equipment and new equipment having a bypass circuit with series resonance circuit, in terms of the strength of spurious radiation or the level of externally induced noise signals.
Figure 31:
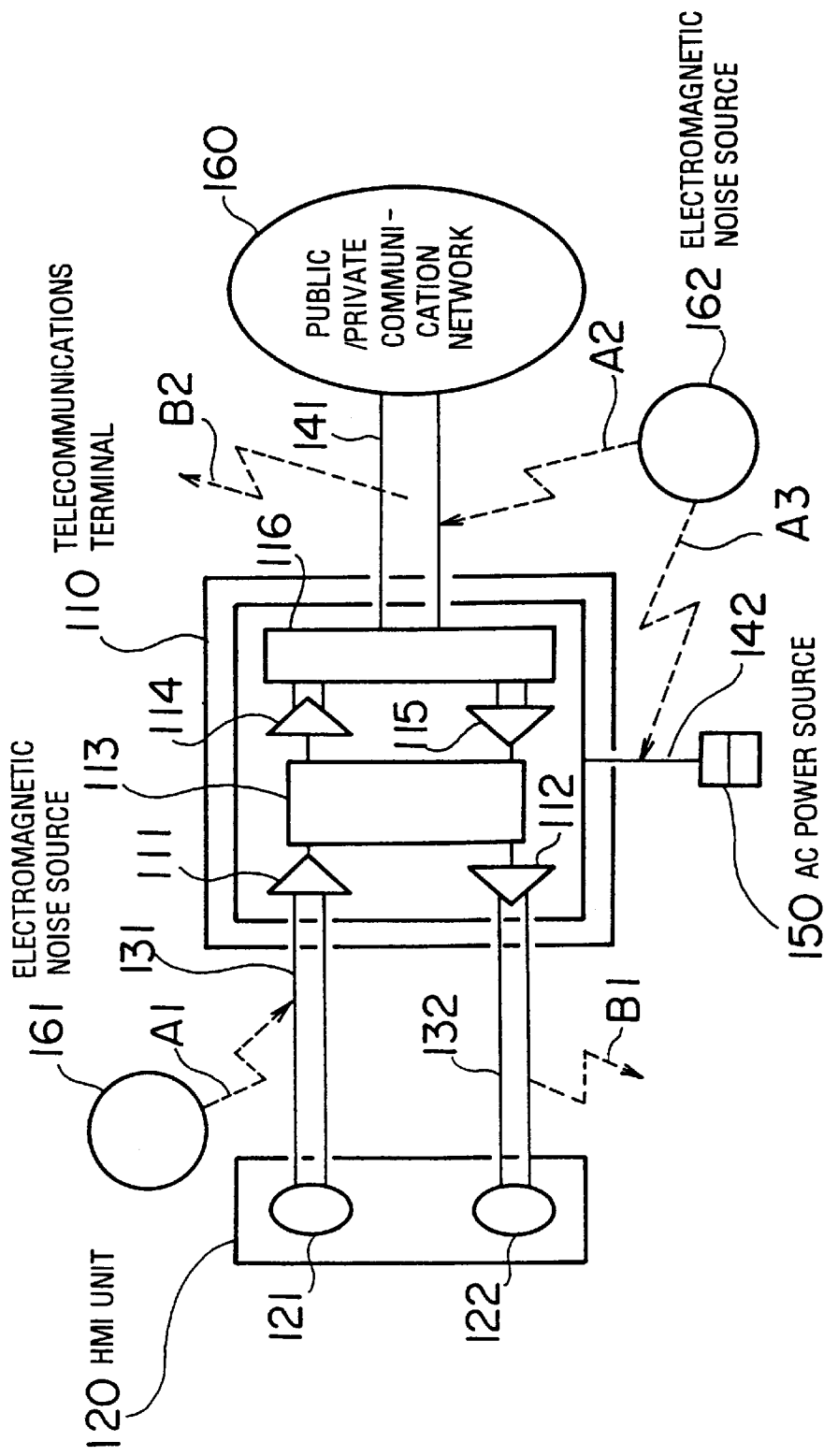
FIG. 31 is a diagram showing an outline of info-telecom equipment for explanation of EMC problems concerned therewith.

FIGS. 29 and 30 show difference in noise strength levels when comparing conventional telecommunications terminal equipment and new equipment according to the present invention, where each curve plots the level L of spurious radiation or that of externally induced noise signal at frequency f.

Figure 32:
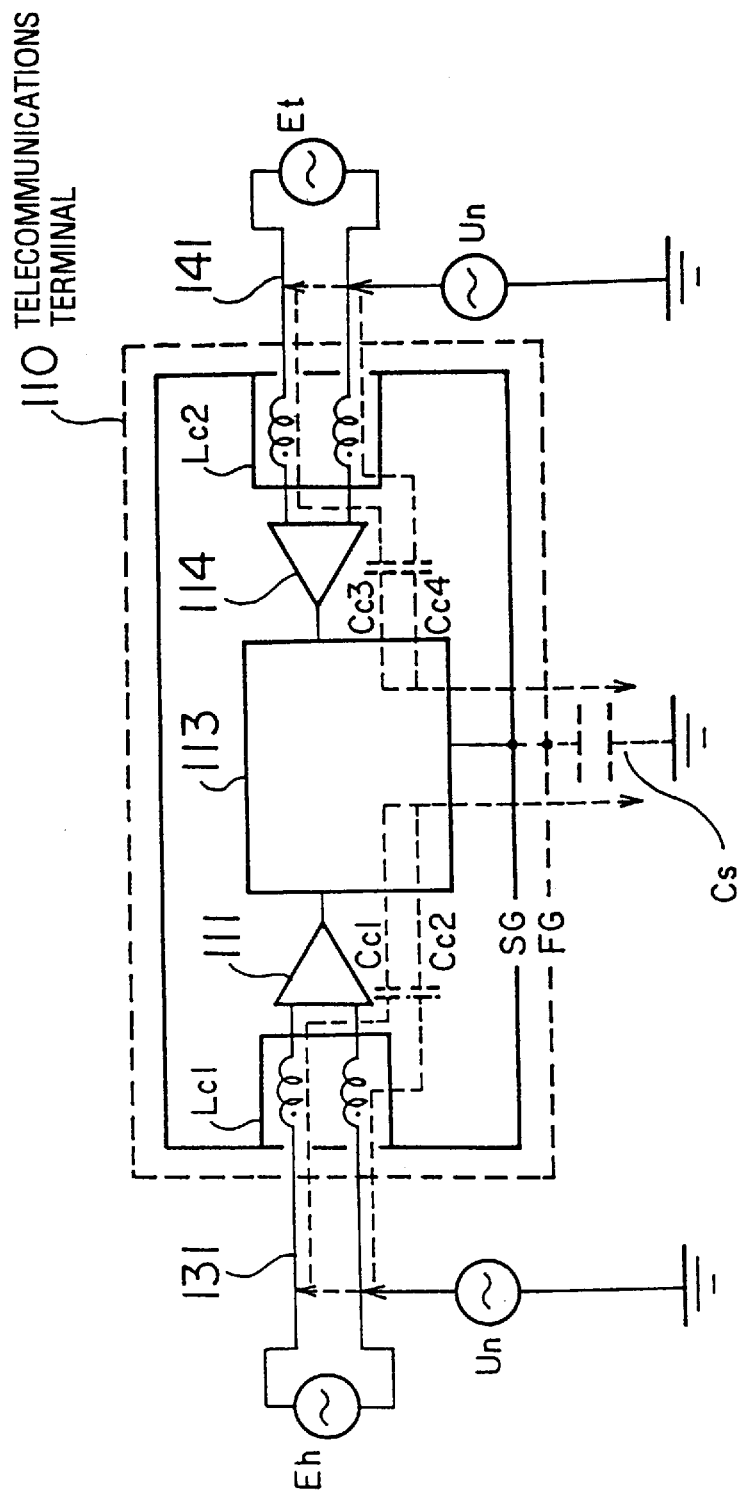
FIG. 32 is a diagram showing some possible paths of incoming electromagnetic noise signals.

In FIG. 29, the upper curve in a broken line is a characteristic of the prior art, which is measured with the conventional terminal equipment in FIG. 32. This curve clearly shows some peaks of the noise radiation or induced noise level at three frequencies f0, 3f0, and 5f0.

On the other hand, the lower curve for the present invention, indicated by a solid line, is a result of measurement using the terminal having a bypass circuit BG as described in FIG. 1. This graph teaches that the resonance wavelengths are shortened (i.e., the resonance frequencies are shifted to higher frequencies $f0_1$, $3f0_1$, and $5f0_1$) and the radiation energy is drastically decreased.

In FIG. 30, the lower curve for the present invention is a result of measurement using the terminal having a bypass circuit BG with a series resonance circuit as described in FIG. 7, while the upper curve for the prior art is the same as that in FIG. 29. This graph shows that a particular frequency component is selectively suppressed by the function of the series resonance circuit incorporated in the bypass circuit BG. That is, the lower curve has a distinctive dip at the frequency 3f0, where the radiation energy is drastically deduced.

Incidentally, it should be noted that all the above explanation about telecommunications terminal equipment can be globally applicable to information technology equipment.

In summary, according to the present invention, the terminal equipment for telecommunications and information processing employs common-mode rejection filters at every input/output interface, and their respective high-frequency junction points are interconnected via a bypass circuit, thus suppressing the noise voltage induced by an electromagnetic noise source.

Further, in another configuration according to the present invention, the terminal equipment employs common-mode rejection filters and their respective high-frequency junction points are interconnected with a series resonance circuit. This series resonance circuit exhibits low impedance to a particular frequency component out of the spectrum of disturbing noise signals and/or spurious emission from an internal noise source, and it results in short-circuiting that particular frequency signal, thus minimizing the voltage induced by the electromagnetic noise source.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. Terminal equipment for telecommunications and information processing which has a human-machine interface and a metallic telecommunications interface, the terminal equipment comprising:

a first common-mode rejection filter disposed at a connection point to the human-machine interface, having a first high-frequency junction point to which unwanted high-frequency components of interface signals thereof are directed;

a second common-mode rejection filter disposed at a connection point to the metallic telecommunications interface, having a second high-frequency junction point to which unwanted high-frequency components of interface signals thereof are directed; and a bypass circuit for interconnecting the first high-frequency junction point of said first common-mode rejection filter and the second high-frequency junction point of said second common-mode rejection filter.

2. Terminal equipment according to claim 1, wherein said first and second common-mode rejection filters comprise a common-mode choke coil and a capacitor.

3. Terminal equipment for telecommunications and information processing which has a human-machine interface and a metallic telecommunications interface, the terminal equipment comprising:

a first common-mode rejection filter disposed at a connection point to the human-machine interface, having a first high-frequency junction point to which unwanted high-frequency components of interface signals thereof are directed;

a second common-mode rejection filter disposed at a connection point to the metallic telecommunications interface, having a second high-frequency junction point to which unwanted high-frequency components of interface signals thereof are directed; and a distributed-constant transmission line having two conductors, one of said conductors being used for interconnection between the first high-frequency junction point of said first common-mode rejection filter and the second high-frequency junction point of said second common-mode rejection filter, the other one of said conductors being connected to a frame ground or a signal ground of the terminal equipment.

4. Terminal equipment according to claim 3, wherein said first and second common-mode rejection filters comprise a common-mode choke coil and a capacitor.

5. Terminal equipment according to claim 3, wherein said distributed-constant transmission line is constructed with a coaxial cable.

6. Terminal equipment according to claim 3, wherein said distributed-constant transmission line is constructed with a parallel-wire transmission line.

7. Terminal equipment for telecommunications and information processing which has a human-machine interface and a metallic telecommunications interface, the terminal equipment comprising:

a first common-mode rejection filter disposed at a connection point to the human-machine interface, having a first high-frequency junction point to which unwanted high-frequency components of interface signals thereof are directed;

a second common-mode rejection filter disposed at a connection point to the metallic telecommunications interface, having a second high-frequency junction point to which unwanted high-frequency components of interface signals thereof are directed; and a series resonance circuit for interconnecting the first high-frequency junction point of said first common mode rejection filter and the second high-frequency junction point of said second common-mode rejection filter, impedance of said series resonance circuit being minimum at a particular disturbance frequency generated by an external noise source or at a particular spurious frequency generated by an internal noise source.

8. Terminal equipment according to claim 7, wherein said first and second common-mode rejection filters comprise a common-mode choke coil and a capacitor.

9. Terminal equipment according to claim 7, wherein inductance and/or capacitance of said series resonance circuit is variable.

10. Terminal equipment according to claim 7, wherein said series resonance circuit is a variable-inductance coil.

11. Terminal equipment according to claim 7, wherein said series resonance circuit has a plurality of resonance frequencies.

12. Terminal equipment according to claim 7, wherein a resonance frequency of said series resonance circuit is variable.

13. Terminal equipment for telecommunications and information processing which has a human-machine interface and a metallic telecommunications interface, the terminal equipment comprising:

a first shielded cable for the human-machine interface, having a first high-frequency junction point to which unwanted high-frequency components of interface signals thereof are directed;

a second shielded cable for the metallic telecommunications interface, having a second high-frequency junction point to which unwanted high-frequency components of interface signals thereof are directed;

a first common-mode choke coil disposed at a connection point of the human-machine interface;

a second common-mode choke coil disposed at a connection point of the metallic telecommunications interface; and a bypass circuit for interconnecting a first shield conductor of said first shielded cable and a second shield conductor of said second shielded cable.

14. Terminal equipment for telecommunications and information processing which has a human-machine interface and a metallic telecommunications interface, the terminal equipment comprising:

a first shielded cable for the human-machine interface, having a first high-frequency junction point to which unwanted high-frequency components of interface signals thereof are directed;

a second shielded cable for the metallic telecommunications interface, having a second high-frequency junction point to which unwanted high-frequency components of interface signals thereof are directed;

a first common-mode choke coil disposed at a connection point of the human-machine interface;

a second common-mode choke coil disposed at a connection point of the metallic telecommunications interface; and a distributed-constant transmission line having two conductors, one of said two conductors being used for interconnection between a first shield conductor of said first shielded cable and a second shield conductor of said second shielded cable, the other one of said two conductors being connected to a frame ground or a signal ground of the terminal equipment.

15. Terminal equipment according to claim 14, wherein said distributed-constant transmission line is constructed with a coaxial cable.

16. Terminal equipment according to claim 7, wherein said distributed-constant transmission line is constructed with a parallel-wire transmission line.

17. Terminal equipment for telecommunications and information processing which has a human-machine interface and a metallic telecommunications interface, the terminal equipment comprising:

a first shielded cable for the human-machine interface, having a first high-frequency junction point to which unwanted high-frequency components of interface signals thereof are directed;

a second shielded cable for the metallic telecommunications interface, having a second high-frequency junction point to which unwanted high-frequency components of interface signals thereof are directed;

a first conmmon-mode choke coil disposed at a connection point of the human-machine interface;

a second common-mode choke coil disposed at a connection point of the metallic telecommunications interface; and a series resonance circuit for interconnecting a first shield conductor of said first shielded cable and a second shield conductor of said second shielded cable, impedance of said series resonance circuit being minimum at a particular disturbance frequency generated by an external noise source or at a particular spurious frequency generated by an internal noise source.

18. Terminal equipment according to claim 17, wherein inductance and/or capacitance of said series resonance circuit is variable.

19. Terminal equipment according to claim 17, wherein said series resonance circuit has a plurality of resonance frequencies.

20. Terminal equipment according to claim 17, wherein a resonance frequency of said series resonance circuit is variable.

21. Terminal equipment for telecommunications and information processing which has a human-machine interface and a metallic telecommunications interface, the terminal equipment comprising:

a first common-mode rejection filter having a discharge element, disposed at a connection point of the human-machine interface, having a first high-frequency junction point to which unwanted high-frequency components of interface signals thereof are directed;

a second common-mode rejection filter having a discharge element, disposed at a connection point of the metallic telecommunications interface, having a second high-frequency junction point to which unwanted high-frequency components of interface signals thereof are directed; and a bypass circuit for interconnecting the first high frequency junction point of said first common-mode rejection filter and the second high-frequency junction point of said second common-mode rejection filter.

22. Terminal equipment for telecommunications and information processing which has a human-machine interface and a metallic telecommunications interface, the terminal equipment comprising:

a first common-mode rejection filter having a discharge element, disposed at a connection point of the human-machine interface, having a first high-frequency junction point to which unwanted high-frequency components of interface signals thereof are directed;

a second common-mode rejection filter having a discharge element, disposed at a connection point of the metallic telecommunications interface, having a second high-frequency junction point to which unwanted high-frequency components of interface signals thereof are directed; and a distributed-constant transmission line having two conductors, one of said two conductors being used for interconnection between the first high-frequency junction point of said first common-mode rejection filter and the second high-frequency junction point of said second common-mode rejection filter, the other one of said two conductors being connected to a frame ground or a signal ground of the terminal equipment.

23. Terminal equipment according to claim 22, wherein said distributed-constant transmission line is constructed with a coaxial cable.

24. Terminal equipment according to claim 22, wherein said distributed-constant transmission line is constructed a parallel-wire transmission line.

* * * * *